(12) United States Patent
Wang et al.

(10) Patent No.: US 9,891,103 B2
(45) Date of Patent: Feb. 13, 2018

(54) ASSEMBLING METHOD OF SPECTROMETER AND ASSEMBLING SYSTEM

(71) Applicant: OTO PHOTONICS INC., Hsinchu (TW)

(72) Inventors: Meng-Hua Wang, Hsinchiu (TW); Shih-Hung Chien, Hsinchu (TW); Jyh-Jau Chen, Hsinchu (TW); Jan Liang Yeh, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 115 days.

(21) Appl. No.: 15/003,795

(22) Filed: Jan. 21, 2016

(65) Prior Publication Data

US 2016/0138973 A1    May 19, 2016

Related U.S. Application Data

(62) Division of application No. 13/747,216, filed on Jan. 22, 2013, now Pat. No. 9,273,997.

(51) Int. Cl.
*G01J 3/28* (2006.01)
*G01J 3/02* (2006.01)
*G01J 3/18* (2006.01)

(52) U.S. Cl.
CPC .......... *G01J 3/0291* (2013.01); *G01J 3/0205* (2013.01); *G01J 3/0237* (2013.01); *G01J 3/0256* (2013.01); *G01J 3/0259* (2013.01); *G01J 3/0262* (2013.01); *G01J 3/18* (2013.01)

(58) Field of Classification Search
CPC ...... G01J 3/0291; G01J 3/0205; G01J 3/0237; G01J 3/0256; G01J 3/0259; G01J 3/0262; G01J 3/18
See application file for complete search history.

(56) References Cited

U.S. PATENT DOCUMENTS 4,274,706 A  *  6/1981  Tangonan ............. G01J 3/0259
                                                          385/130

FOREIGN PATENT DOCUMENTS

WO     WO 2011120234 A1 * 10/2011 ............ G01J 3/0256

* cited by examiner

*Primary Examiner* — Jamil Ahmed
(74) *Attorney, Agent, or Firm* — Cheng-Ju Chiang

(57) ABSTRACT

A spectrometer comprising a waveguide module, a diffractive component, and a light sensor is provided. The waveguide module has a first reflective surface, a second reflective surface opposite to the first reflective surface, and a light channel between the first reflective surface and the second reflective surface. The diffractive component has a diffractive surface and a plurality of strip-shaped diffractive structures located on the diffractive surface. The sharpness of the profile of the strip-shaped diffractive structures on a first side of the diffractive surface is greater than that on a second side of the diffractive surface. When viewed along a direction perpendicular to the second reflective surface, the first side of the diffractive surface is positioned between the first reflective surface and the second reflective surface with a distance away from the second reflective surface. A method for assembling the spectrometer and an assembling system are also provided.

20 Claims, 25 Drawing Sheets

ASSEMBLING METHOD OF SPECTROMETER AND ASSEMBLING SYSTEM

CROSS-REFERENCE TO RELATED APPLICATION

This application is a divisional application of patent application Ser. No. 13/747,216, which is filed on Jan. 22, 2013 and claims the priority benefit of Taiwan Patent Application No. 101142874, filed on Nov. 16, 2012, which is hereby incorporated by reference in its entirety.

BACKGROUND OF THE INVENTION

1. Field of the Invention

The present invention relates to a light instrument, associated assembling method and assembling system, and more particularly relates to a spectrometer, its associated assembling method and assembling system.

2. Description of Related Art

A spectrometer can typically disperse light of complex composition into a light spectrum, and may include a prism or a diffractive grating. Spectrometers can measure how much light is reflected from or transmitted through an object. Optical signals captured by a spectrometer can be developed on photographic films or be displayed and analyzed by a computer to give information on elemental compositions of the object to be measured. Based on optical principles, spectrometers are often used to observe, analyze, and process the structure and composition of matters. There are several advantages associated with spectrometers, including: high precision and accuracy, large measurement range, high speed and smaller amount of sample used, etc. Therefore, spectrometers have been widely used by agencies and institutes in the areas of metallurgy, geology, petroleum and chemical industries, medicine and health, and environmental protection. In addition, spectrometers are also a necessity for applications in military reconnaissance, space exploration, and resources and hydrological surveys.

SUMMARY OF THE INVENTION

The present invention provides a spectrometer which can improve the optical quality of spectra measured by the spectrometer.

The present invention also provides a method for assembling a spectrometer which can improve the optical quality of spectra measured by the spectrometer.

The present invention further provides a system, for assembling a spectrometer, through which relative positions of a diffractive component and a light sensor can be precisely adjusted.

According to one aspect, a spectrometer may comprise a waveguide module, a diffractive component, and a light sensor. The waveguide module may include a first reflective surface, a second reflective opposite to the first reflective surface, and a light channel located between the first reflective surface and the second reflective surface. The diffractive component may include a diffractive surface with a plurality of strip-shaped diffractive structures. A sharpness of a profile of the strip-shaped diffractive structures at a first side of the diffractive surface may be greater than a sharpness of the profile of the strip-shaped diffractive structures at a second side of the diffractive surface. The first side of the diffractive surface may be located between the first reflective surface and the second reflective surface, with the first side of the diffractive surface spaced apart from the second reflective surface, when viewed along a direction generally perpendicular to the second reflective surface. The light sensor may receive diffracted light after light transmitted in the light channel is diffracted into the diffracted light by the diffractive surface.

In at least one embodiment, the waveguide module may comprise a first base body and a second base body. The first base body may include the first reflective surface. The second base body may include the second reflective surface. The light channel may be formed between the first base body and the second base body. The diffractive component may be disposed on at least one of the first base body or the second base body.

In at least one embodiment, the spectrometer may further comprise a heightening component disposed between the diffractive component and at least one of the first base body or the second base body.

In at least one embodiment, the spectrometer may further comprise a light input port. At least a part of light entering into the spectrometer via the light input port may be transmitted within the light channel to the diffractive surface of the diffractive component.

In at least one embodiment, a light output channel may be formed between the diffractive component and the second base body. The light output channel may be adjacent to the heightening component. A part of the light entering into spectrometer via the light input port may exit the light channel via the light output channel.

In at least one embodiment, the heightening component and the diffractive components may be formed integrally.

In at least one embodiment, the heightening component may comprise a plurality of spacers spaced apart with respect to each other in a direction substantially parallel to the second reflective surface.

In at least one embodiment, the heightening component may include a light absorbing surface.

In at least one embodiment, the heightening component may comprise a transparent component.

In at least one embodiment, the heightening component may comprise at least one light confinement groove, located on a surface of the heightening component facing the light channel, such that light entering into the at least one confinement groove is repeatedly reflected by and confined in the at least one light confinement groove.

In at least one embodiment, the heightening component may comprise at least one position reference mark that indicates relative positions of the diffractive component and the heightening component.

In at least one embodiment, the second base body may comprise a case and a reflective plate disposed on the case. A surface of the reflective plate may be the second reflective surface, and the heightening component may be disposed on the reflective plate.

In at least one embodiment, the second base body may comprise a case and a reflective plate disposed on the case. A surface of the reflective plate may be the second reflective surface, and the heightening component may be disposed on the case.

In at least one embodiment, the waveguide module may comprise a first base body, having the first reflective surface, a second base body, having the second reflective surface, and an adhesive material. The light channel may be formed between the first base body and the second base body. The adhesive material may secure the diffractive component to at least one of the first base body or the second base body.

In at least one embodiment, the diffractive component may include a backside opposite to the diffractive surface. The adhesive material may connect the backside of the diffractive component to the second base body such that the diffractive component is secured on the second base body.

In at least one embodiment, the waveguide module may comprise a first base body, having the first reflective surface, and a second base body, having the second reflective surface. The light channel may be formed between the first base body and the second base body. At least one of the first base body or the second base body may include a fixing component that secures a position of the diffractive component.

In at least one embodiment, the waveguide module may comprise a light guiding body provided as the light channel, a first reflective film disposed on the light guiding body, and a second reflective film disposed on the light guiding body such that the light guiding body is between the first reflective film and the second reflective film. An interface between the first reflective film and the light guiding may form the first reflective surface. An interface between the second reflective film and the light guiding body may form the second reflective surface.

In at least one embodiment, the diffractive component may comprise a notch having a bottom surface and the diffractive surface. The diffractive surface may be inclined relative to the bottom surface. The bottom surface may be inclined relative to the second reflective surface such that the diffractive surface is approximately parallel with a normal vector of the second reflective surface.

In at least one embodiment, the strip-shaped diffractive structures may be substantially parallel with respect to each other. The diffractive surface may be a curved concave surface.

In at least one embodiment, the diffractive component may comprise a notch and a surface. The notch may include a respective diffractive surface and a bottom surface connected to the respective diffractive surface. The surface may be connected to the bottom surface. At least a portion of the surface may face the light channel and may be coated with a light absorbing material.

In at least one embodiment, the diffractive surface may be formed by etching started from the first side of the diffractive surface.

In at least one embodiment, the spectrometer may further comprise a positioning means for setting a position of the first side of the diffractive surface such that the first side of the diffractive surface is spaced apart from the second reflective surface when viewed from a direction perpendicular to the second reflective surface.

In at least one embodiment, the diffractive component may comprise a notch and an allocation surface. The notch may include a respective diffractive surface and a bottom surface connected to the respective diffractive surface. The allocation surface may be connected to the bottom surface of the notch. The allocation surface may face the second reflective surface and may be coated with a reflective material.

In at least one embodiment, the waveguide module may comprise a first base body, having the first reflective surface, and a second base body, having the second reflective surface. The light channel may be formed between the first base body and the second base body. The spectrometer may further comprise a connecting unit that connects the diffractive component to the first base body of the waveguide module. A deformation of the first base body due to a temperature change in the spectrometer may cause a change in a dimension of the diffractive component.

In at least one embodiment, the connecting unit may comprise a fixing component and a plurality of pieces of an adhesive material. The fixing component may be disposed on the first base body. The fixing component may include a plurality of first through holes. A first part of the first through holes may expose a portion of the diffractive component, and a second part of the first through holes may expose a portion of the first base body. The plurality of pieces of an adhesive material may be filled in the first through holes. Some of the pieces of the adhesive material filled in the first part of the first through holes may connect the fixing component to the diffractive component. Some other pieces of the adhesive material filled in the second part of the first through holes may connect the fixing component to the first base body.

In at least one embodiment, the connecting unit may comprise a gasket disposed between the diffractive component and the fixing component. The gasket may include at least one second through hole interlinked with the first part of the first through holes such that the first part of the first through holes and the at least one second through hole are filled with the adhesive material to connect the fixing component, the gasket, and the diffractive component together.

In at least one embodiment, the first base body may comprise a reflective plate and a case. The reflective plate may be disposed on the second base body and may include the first reflective surface. The connecting unit may connect the diffractive component and the reflective plate. A deformation of the reflective plate due to a temperature change in the spectrometer may cause a change in a dimension of the diffractive component through the connecting unit. The case may cover the reflective plate.

In at least one embodiment, the reflective plate may include a side to which the diffractive component is secured by the connecting unit. The connecting unit may comprise an adhesive material.

According to another aspect, a spectrometer may comprise a waveguide module, a diffractive component, and a light sensor. The waveguide module may include a first reflective surface, a second reflective surface opposite to the first reflective surface, and a light channel located between the first reflective surface and the second reflective surface. The diffractive component may include an allocation surface and a notch located on a side of the allocation surface. The notch may include a diffractive surface that is inclined relative to the second reflective surface such that the diffractive surface is generally parallel with a normal vector of the second reflective surface. The light sensor may receive diffracted light after light transmitted in the light channel is diffracted into the diffracted light by the diffractive surface.

In at least one embodiment, the waveguide module may comprise a first base body, having the first reflective surface, and a second base body, having the second reflective surface. The light channel may be formed between the first base body and the second base body. The diffractive component may be disposed on at least one of the first base body or the second base body.

In at least one embodiment, the spectrometer may further comprise a heightening component disposed between the diffractive component and the second base body and disposed on a side of the diffractive component away from the diffractive surface.

According to one aspect, a method for assembling a spectrometer may comprise: disposing a diffractive component along a side of a light channel of a waveguide module, wherein the waveguide module comprises a first reflective surface and a second reflective surface opposite to the first reflective surface, wherein the light channel is located between the first reflective surface and the second reflective surface, and wherein the diffractive component has a diffractive surface; disposing a light sensor on one end of the light channel; transmitting light to the diffractive surface via the light channel such that at least a portion of the light is diffracted into diffracted light by the diffractive surface and the diffracted light is incident on the light sensor; adjusting at least one of a position of the diffractive surface along a direction substantially perpendicular to the second reflective surface or an angle between the diffractive surface and the second reflective surface, and measuring a corresponding spectrum of light incident on the light sensor; determining whether the spectrum of the light incident on the light sensor meets a predefined first sharpness condition; and securing the diffractive component when the spectrum of the light incident on the light sensor meets the predefined first sharpness condition; or adjusting either or both of the position and the angle of the diffractive surface until the spectrum of the light incident on the light sensor meets the predefined first sharpness condition.

In at least one embodiment, transmitting light to the diffractive surface may comprise transmitting the light to the diffractive surface sequentially through a light input port and the light channel. The method may further comprise adjusting the position of the diffractive surface along a direction that is substantially parallel to the second reflective surface and substantially perpendicular to a line connecting the light input port and the diffractive surface.

In at least one embodiment, transmitting light to the diffractive surface may comprise transmitting the light to the diffractive surface sequentially through a light input port and the light channel. The method may further comprise adjusting a distance between the diffractive surface and the light input port.

In at least one embodiment, the method may further comprise adjusting a first rotation angle of the diffractive surface. The first rotation angle may be an angle around an axis that is substantially parallel to a normal vector of the second reflective surface.

In at least one embodiment, transmitting light to the diffractive surface may comprise transmitting the light to the diffractive surface sequentially through a light input port and the light channel. The method may further comprise adjusting a second rotation angle of the diffractive surface. The second rotation angle may be an angle around an axis that is substantially parallel to a line connecting the light input port and the diffractive surface.

In at least one embodiment, securing the diffractive component may comprise securing the diffractive component to at least one of the first or the second base bodies by an adhesive material. The first base body may include the first reflective surface, and the second base body may include the second reflective surface.

In at least one embodiment, the method may further comprise adjusting at least one of a position or an angle of the light sensor with respect to the light channel.

In at least one embodiment, the method may further comprise: adjusting at least one of a position or an angle of the light sensor with respect to the light channel after securing the diffractive component, and measuring a corresponding spectrum of the light incident on the light sensor; determining whether the corresponding spectrum of the light incident on the light sensor meets a predefined second sharpness condition; and securing the light sensor when the corresponding spectrum of the light incident on the light sensor meets the predefined second sharpness condition; or adjusting at least one of the position or the angle of the light sensor until the corresponding spectrum of the light incident on the light sensor meets the predefined second sharpness condition.

In at least one embodiment, adjusting at least one of a position of the diffractive surface in a direction substantially perpendicular to the second reflective surface or an angle between the diffractive surface and the second reflective surface may comprise determining at least one of the position or the angle of the diffractive surface in a second measurement based on the at least one of the position or the angle of the diffractive surface used to obtain a spectrum in a first measurement.

According to one aspect, an assembling system may comprise: a carrier that carries a waveguide module, the waveguide module having a first reflective surface, a second reflective surface opposite to the first reflective surface, and a light channel located between the first reflective surface and the second reflective surface; a first fixture that carries a diffractive component having a diffractive surface disposed along a side of the light channel, the first fixture configured to adjust at least one of a position of the diffractive component along a direction substantially perpendicular to the second reflective surface or an angle between the diffractive surface and the second reflective surface; and a second fixture that carries a light sensor disposed at one end of the light channel, the second fixture configured to adjust at least one of a position or an angle of the light sensor.

In at least one embodiment, one end of the waveguide module may include a light input port. The first fixture may adjust a position of the diffractive surface along a direction that is substantially parallel to the second reflective surface and substantially perpendicular to a line connecting the light input port and the diffractive surface.

In at least one embodiment, one end of the waveguide module may include a light input port. The first fixture may adjust a distance between the diffractive surface and the light input port.

In at least one embodiment, the first fixture may adjust a first rotation angle of the diffractive surface. The first rotation angle may be an angle around an axis that is substantially parallel to a normal vector of the second reflective surface.

In at least one embodiment, one end of the waveguide module may include a light input port. The first fixture may adjust a second rotation angle of the diffractive surface. The second rotation angle may be an angle around an axis that is substantially parallel to a line connecting the light input port and the diffractive surface.

In at least one embodiment, the assembling system may further comprise an adhesive dispenser. The adhesive dispenser may apply an adhesive material onto the diffractive component to secure the diffractive component to at least one of a first base body having the first reflective surface or a second base body having the second reflective surface.

In at least one embodiment, the assembling system may further compose a first actuator that drives the first fixture, a second actuator that drives the second fixture, and a controller electrically connected to the first actuator and the second actuator to control operations of the first actuator and the second actuator.

In at least one embodiment, the controller may be electrically connected to the light sensor and the adhesive dispenser. The controller may receive spectral signals measured by the light sensor and determining at least one of a position or an angle of the diffractive component and at least one of a position or an angle of the light sensor based on the received spectral signals. The controller may determine whether a sharpness of the spectral signals meets a standard based on a determination procedure such that, when the standard are met. The controller may command the adhesive dispenser to apply the adhesive material onto the diffractive component, otherwise, the controller may command the first actuator and the second actuator to adjust the at least one of the position or the angle of the diffractive component or the at least one of the position or the angle of the light sensor until the sharpness of the spectral signals meets the standard. As to the spectrometer in accordance with the embodiments of the present invention, when viewed along a direction perpendicular to the second reflective surface, the first side of the diffractive surface is positioned between the first reflective surface and the second reflective surface with a distance away from the second reflective surface, a portion of light transmitted in the light channel with higher intensity is diffracted by the part of the diffractive surface having a sharper profile. As a result, the optical quality of the spectra measured by the spectrometer can be enhanced. As to the spectrometer in accordance with the embodiments of the present invention, since the allocation surface of the diffractive component is inclined relative to the second reflective surface, the diffractive surface is generally parallel with the normal vector of the second reflective surface. As a result, the optical quality of the spectra obtained can be enhanced. As to the method for assembling spectrometers in accordance with the embodiments of the present invention, since the diffractive component is secured after at least one of the position and angle of the diffractive component has been adjusted until the spectrum obtained meets the predefined sharpness condition, the diffractive component can be secured at an appropriate position. As a result, the optical quality of the spectra obtained can be enhanced. As to the system for assembling the spectrometer in accordance with the embodiments of the present invention, since the first fixture and the second fixture are configured to adjust the diffractive component and the light sensor, respectively, the relative positions of the diffractive component and the light sensor can be accurately adjusted. As a result, the optical quality of the spectra obtained can be enhanced.

Detailed description of selected embodiments of the present invention is provided below with reference to the attached figures to aid better understanding of the present invention.

DETAILED DESCRIPTION OF PREFERRED EMBODIMENTS

Figure 1A:
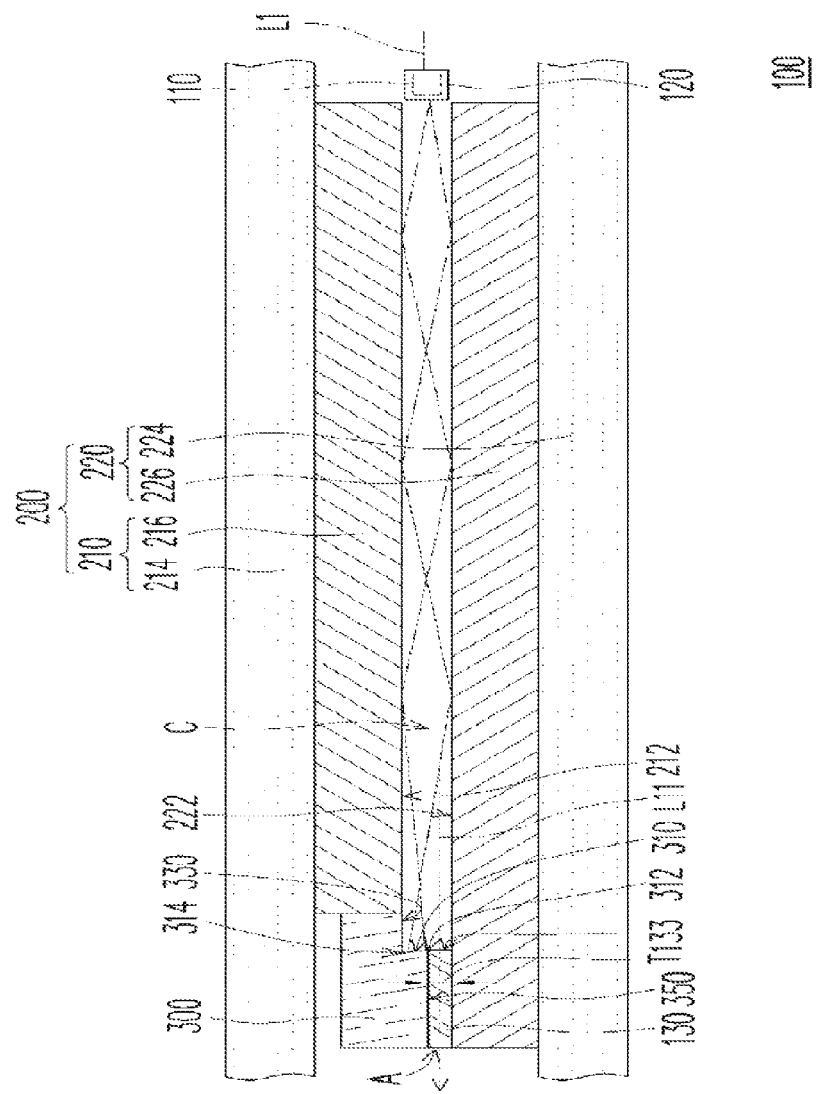
FIG. 1A is a side view of a spectrometer in accordance with one embodiment of the present invention.
Figure 1B:
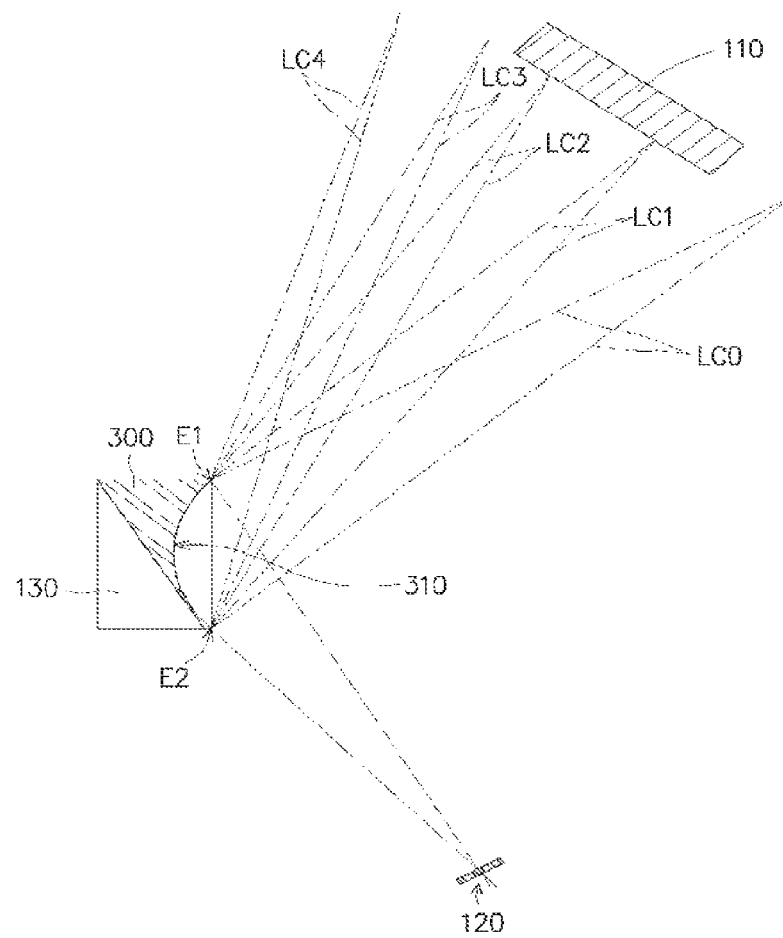
FIG. 1B is a top view of the spectrometer of FIG. 1A.
Figure 1C:
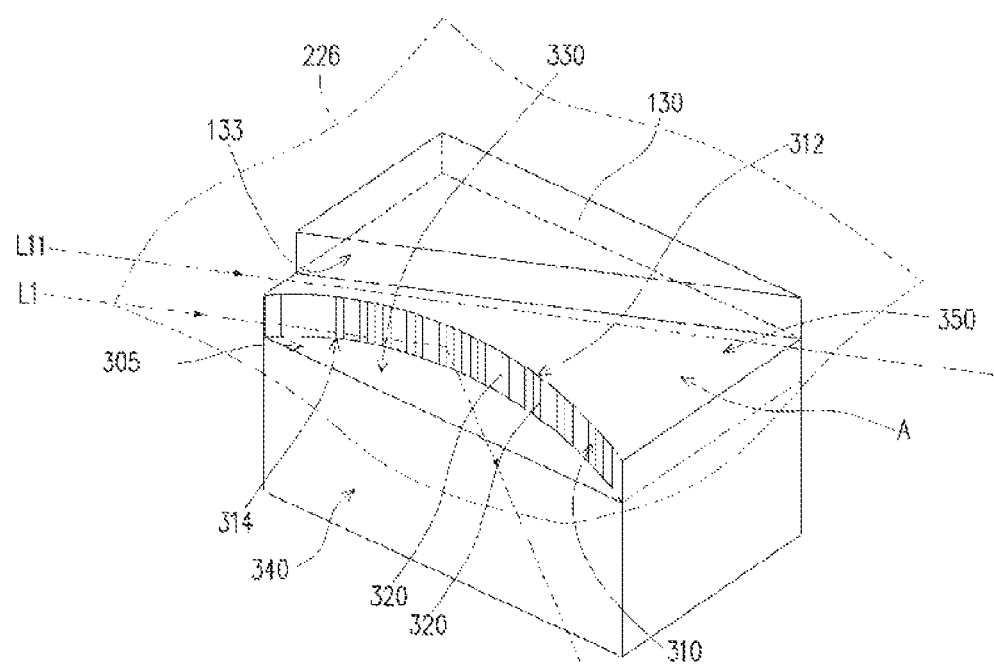
FIG. 1C is a perspective view of a diffractive grating and a heightening component of the spectrometer of FIG. 1A.

FIG. 1A a side view of a spectrometer in accordance with one embodiment of the present invention. FIG. 1B is a top view of the spectrometer of FIG. 1A. In order to aid readers in understanding the relative positions of the light input port, the diffractive component, and the light sensor, the first base body and the second base body in FIG. 1A are omitted in FIG. 1B. FIG. 1C is a perspective view of a diffractive grating and a heightening component of the spectrometer of FIG. 1A. Referring to FIGS. 1A, 1B and 1C, a spectrometer 100 of the present embodiment includes a waveguide module 200, a diffractive component 300, and a light sensor 110. In the present embodiment, the spectrometer 100 includes a light input port 120 through which light L1, to be measured, enters into the spectrometer 100. FIG. 1A is a side view of FIG. 1B, as viewed from the light input port 120 towards the light sensor 110; therefore, in FIG. 1A, the light sensor 110 is located behind the light input port 120.

The waveguide module 200 includes a first reflective surface 212, a second reflective surface 222 opposite to the first reflective surface 212, and a light channel C located between the first reflective surface 212 and the second reflective surface 222. The diffractive component 300 has a diffractive surface 310 with a plurality of strip-shaped diffractive structures 320 thereon. The sharpness of the profile of the strip-shaped diffractive structures 320 on a first side 312 of the diffractive surface 320 is greater than that of the strip-shaped diffractive structures 320 on a second side 314 of the diffractive surface 320. In the present embodiment, the diffractive component 300 includes an allocation surface 350 with a notch 305 provided on one side of the allocation surface 350. The notch 305 has a bottom surface 330 and a diffractive surface 310 connected to the bottom surface 330. In addition, in the present embodiment, the diffractive component 300 is made of a semiconductor material, such as silicon for example but not limited thereto. The notch 305 is formed, for example, by a semiconductor etching process. A bulk semiconductor material is etched, along a direction from the first side 312 towards the second side 314 through a photomask or a mask with the diffractive structure profile, until the bottom surface 330 is reached. The strip-shaped diffractive structures 320 are also formed during this etching process. The semiconductor etching process is, for example, the etching process used in fabricating micro-electro-mechanical systems (MEMS). Since the etching is along a direction from the first side 312 towards the second side 314, the sharpness of the profile of the strip-shaped diffractive structures 320 in the present embodiment decreases along the direction from the first side 312 towards second side 314.

The diffractive surface 310 diffracts light L1, transmitted in the light channel C, and the diffracted light is transmitted to the light sensor 110. In the present embodiment, the light sensor 110 is an image sensor, such as a one-dimensional image sensor for example. However, in other embodiments, the light sensor 110 may be a two-dimensional image sensor. The light input port 120 is, for example, a slit, which may extend in a direction substantially parallel to the extending direction of the stripe-shaped diffractive structures 320. At least a portion of the light L1 that enters into the spectrometer 100 via the light input port 120 is transmitted in the light channel C to the diffractive surface 310 of the diffractive component 300. More specifically, at least a portion of the light L1 that enters into the light channel C via the light input port 120 is continuously reflected by the first reflective surface 212 and the second reflective surface 222, and then transmitted to the diffractive surface 310. The diffractive surface 310 diffracts light L1, forming diffracted light of numerous different orders, LC0, LC1, LC2, LC3, LC4. At least a portion of the diffracted light LC0, LC1, LC2, LC3, LC4 is transmitted to the light sensor 110 where a spectrum is formed.

Figure 2:
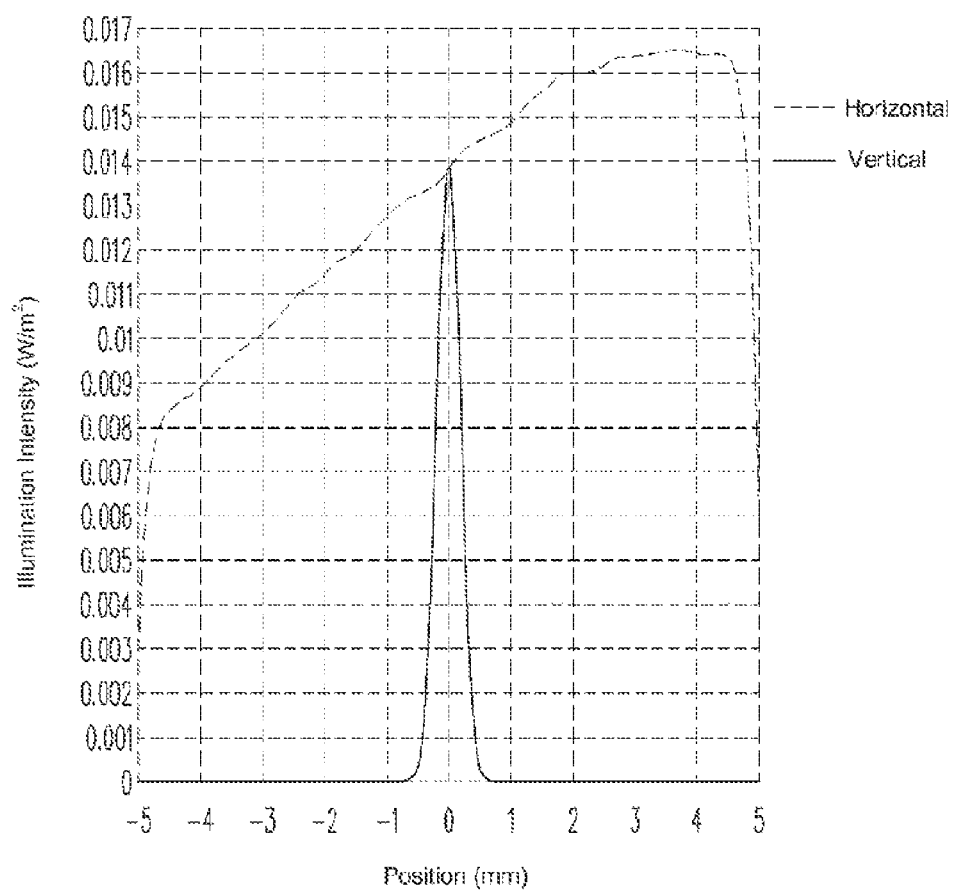
FIG. 2 is a graph showing distribution of light intensity on a plane located at a junction of a diffractive component and a light channel.

FIG. 2 is graph showing distribution of light intensity on a plane located at a junction of the diffractive component 300 and the light channel C. In FIG. 2, a direction from the first reflective surface 212 to the second reflective surface 222 is represented by the vertical direction, while a direction from a first end E1 on the diffractive surface 310 which is away from the light input port 120 to a second end E2 on the diffractive surface 310 which is closer to the light input port 120 is represented by the horizontal direction. As shown in FIG. 2, in the present embodiment, since the intensity of the light L1 entering through the light input 120 has, for example, a Gaussian distribution, and the light L1 is continuously reflected by the first reflective surface 212 and the second reflective surface 222, the maximum intensity of the light L1 is located approximately on a midplane between the first reflective surface 212 and the second reflective surface 222. The distance between the midplane and the first reflective surface 212 is substantially equal to the distance between the midplane and the second reflective surface 222. In addition, since the first end E1 is further away from the light input port 120 compared to the second end E2, in the horizontal direction, the intensity of the light L1 tends to gradually increase along a direction from the first end E1 towards the second end E2.

In the present embodiment, when viewed along a direction perpendicular to the second reflective surface 222, the first side 312 of the diffractive surface 310 is located between the first reflective surface 212 and the second reflective surface 222 with a spacing, or gap, T between the first side 312 of the diffractive surface 310 and the second reflective surface 222. That is, when viewed from either the top or the bottom of FIG. 1A, the first side 312 is located between the first reflective surface 212 and the second reflective surface 222 with the spacing T between the first side 312 and the second reflective surface 222. Due to the greater sharpness of the profile of the strip-shaped diffractive structures 320 on the first side 312 of the diffractive surface 310 and the resulting better diffraction effect, and due to the lower intensity of the light L1 in the vicinity of the first reflective surface 212 and the second reflective surface 222 as well as the higher intensity of the light L1 in the vicinity of the midplane between the first reflective surface 212 and the second reflective surface 222, a height position of the first side 312 (i.e., the position in a direction perpendicular to the second reflective surface 222) is located between the first reflective surface 212 and the second reflective surface 222. This allows the portion of the light L1 with higher intensity to be diffracted by the portion of the stripe-shaped diffractive structures 320 with sharper profile, thereby enhancing the optical quality (e.g., the resolution and/or sensitivity) of the spectra measured by the light sensor 110. Furthermore, in FIG. 1C, when a surface 340 faces the optical channel C, light L1 will be incident on the surface 340 to produce stray light. However, in FIG. 1A, the presence of the heightening component 130 causes the position of the surface 340 to shift to a side facing a reflective plate 216, thus effectively reducing the formation of stray light.

In the present embodiment, the waveguide module 200 includes a first base body 210, which has the first reflective surface 212, and a second base body 220, which has the second reflective surface 222. The light channel C is formed between the first base body 210 and the second base body 220, and the diffractive component 300 is disposed on the second base body 220. In the present embodiment, the first base body 210 includes a case 214 and the reflective plate 216, which is disposed on the case 214. The first reflective surface 212 serves as the surface of the reflective plate 216. Similarly, the second base body 220 may also include a case 224 and a reflective plate 226, which is disposed on the case 224. The second reflective surface 222 serves as the surface of the reflective plate 226. In addition, the reflective plate 216 is disposed between the reflective plate 226 and the case 214, and the reflective plate 226 is disposed between the reflective plate 216 and the case 224. In the present embodiment, the light channel C is the space formed between the reflective plate 216 and the reflective plate 226 such that a waveguide is formed between the reflective plate 216 and the reflective plate 226.

Figure 3A:
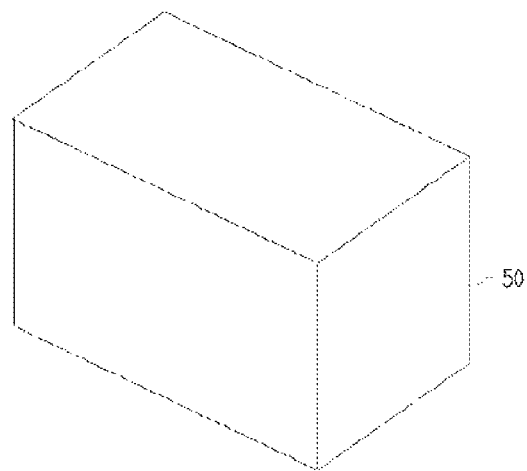
FIG. 3A is a diagram of a bulk semiconductor used to make the diffractive component.
Figure 3B:
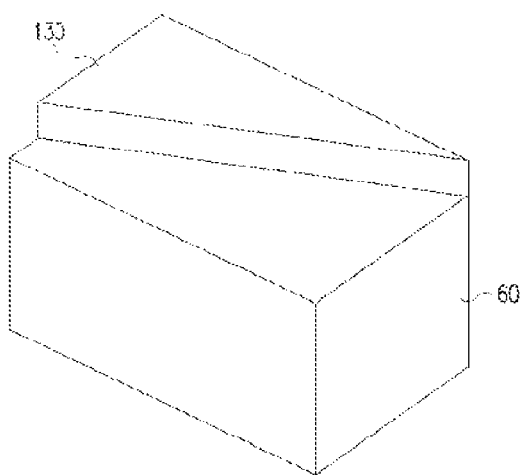
FIG. 3B is a diagram showing the bulk semiconductor of FIG. 3A being etched to form a heightening component.

In the present embodiment, the spectrometer 100 also includes a positioning means so as to position the first side 312 of the diffractive surface 310 between the first reflective surface 212 and the second reflective surface 222 and to keep the spacing T between the first side 312 of the diffractive surface 310 and the second reflective surfaces 222, when viewed along a direction perpendicular to the second reflective surface 222. In the present embodiment, the positioning means may be the heightening component 130, disposed between the diffractive component 300 and the second base body 220. In the present embodiment, the heightening component 130 is disposed on the reflective plate 226, and the diffractive component 300 is disposed on the heightening component 130. However, in other embodiments, the heightening component 130 may also be disposed on the case 224, and the diffractive component 300 may be disposed on the heightening component 130. In the present embodiment, the heightening component 130 is, for example, a gasket. In the present embodiment, the heightening components 130 can increase the height of the allocation surface 350 so as to change the position of the diffractive surface 310, thereby positioning the first side 312 of the diffractive surface 310 closer to the midplane between the first reflective surface 212 and the second reflective surface 222. Due to the higher intensity of light on the midplane, positioning the first side 312 (where the sharpness of the profile of the stripe-shaped diffractive structures 320 is greater) closer to the midplane can enhance the diffraction effect of the diffractive surface 310. In other embodiments, the heightening component 130 may also be integrally formed with the diffractive component 300. For example, both the heightening component 130 and the diffractive components 300 can be made of the same semiconductor material (such as silicon). Before using the semiconductor etching process to form the notch 305, a bulk semiconductor material 50 (as shown in FIG. 3A) can be etched to form the heightening component 130 first as shown in FIG. 3B. Subsequently, the remaining portion 60 of the bulk semiconductor material 50 can be further etched to form the notch 305 and the diffractive surface 310 as shown in FIG. 1C.

In the present embodiment, a light output channel A adjacent to the heightening component 130 is formed between the diffractive component 300 and the second base body 220, through which another portion of the light L11 coming from the light input port 120 exits the light channel C. In the present embodiment, the heightening components 130 may be in the form of a triangle, and a space (i.e., the light output channel A) next to the hypotenuse of the triangle can be provided to allow the light L11 to pass through. In this way, the light L11 can exit the light channel C via the light output channel A rather than being reflected by the heightening component 130 to generate stray light inside the light channel C to thereby impact the quality of the spectra measured by the light sensor 110. This design advantageously reduces the noise level of the spectra. In the present embodiment, the heightening component 130 includes a surface 133 that can be, for example, a light absorbing surface that absorbs the part of the light L1 that is incident on the heightening component 130. As a result, no stray light would be derived from this part of the light L1 to affect the quality of the spectra. However, in other embodiments, the heightening component 130 may also be a transparent component, so that the part of the light L1 incident on the heightening component 130 can directly pass through the heightening component 130 and exit the light channel C without forming stray light in the light channel C to affect the quality of the spectra. In other embodiments, the heightening component 130 may also be in a non-triangular form to provide the light output channel A. Rather, the heightening component 130 may have a shape generally corresponding to the shape of the diffractive component 300 (e.g., in a rectangular form) with no light output channel A formed. In addition, the heightening component 130, which has a shape generally corresponding to the shape of the diffractive component 300, may have a light absorbing surface, or the heightening component 130 may also be transparent so as to reduce the formation of stray light.

In the present embodiment, the strip-shaped diffractive structures 320 are positioned substantially parallel with respect to each other, and the diffractive surface 310 is a curved concave surface. In other words, these strip-shaped diffractive structures 320 are arranged substantially parallel with respect to each other on a curved surface. In this way, light L1 diffracted by the diffractive surface 310, which is curved, can be transmitted in a converging manner to the light sensor 110. Accordingly, between the diffractive surface 310 and the light sensor 110, either no lens for the purpose of focusing the diffracted light L1 is needed or fewer lenses would be needed to focus the diffracted light L1. As a result, the volume or size of the spectrometer 100 can be effectively reduced.

Figure 4:
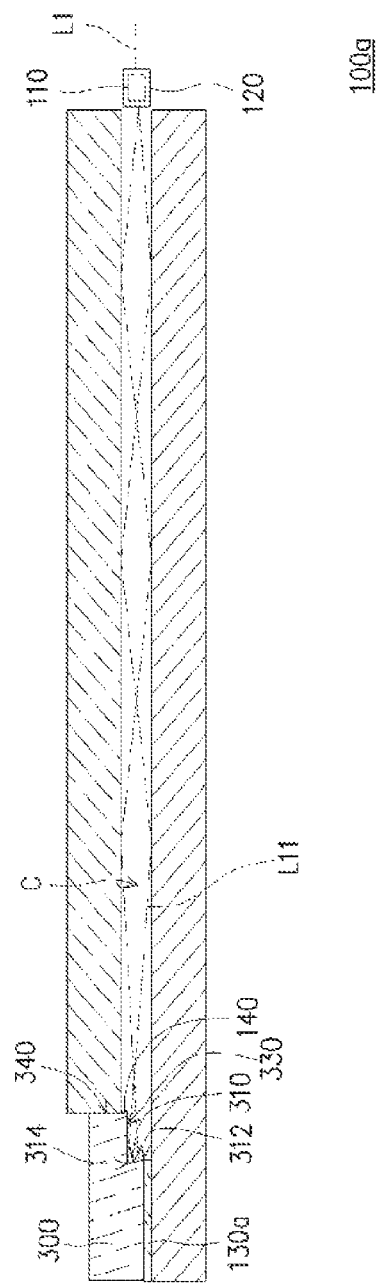
FIG. 4 is a side view of a spectrometer in accordance with another embodiment of the present invention.

FIG. 4 is a side view of a spectrometer in accordance with another embodiment of the present invention. Referring to FIG. 4, the spectrometer 100*a* of the present embodiment is similar to the spectrometer 100 shown in FIG. 1A. Differences between the spectrometer 100*a* and the spectrometer 100 are described below. The thickness of the heightening component 130*a* in the spectrometer 100*a* of the present embodiment is less than the thickness of the heightening component 130 shown in FIG. 1A; therefore, at least a part of the surface 340 of the diffractive component 330 that is connected to the bottom surface 330 (FIG. 4, near the bottom portion) is facing the light channel C. In addition, a light absorbing material 140 may be applied on the part of the surface 340 facing the light channel C. Thus, when the light L1 transmitted in the light channel C is incident on the surface 340, the light L1 will be absorbed by the light absorbing material 140 rather than reflected by the surface 340 to form stray light. In other embodiments, the entire surface of the surface 340 may be coated with the light absorbing material 140. In addition to being coated on the surface 340, the light absorbing material 140 may also be coated on other surfaces of the diffractive component 300 except the diffractive surface 310 such as, for example, those surfaces on which the light L1 may be incident.

Figure 5A:
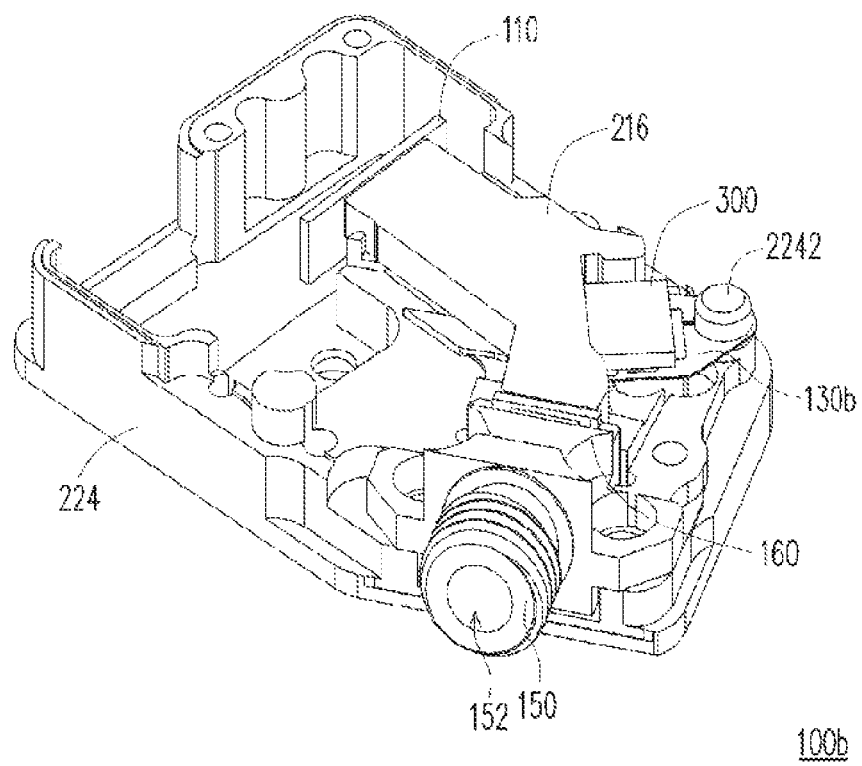
FIG. 5A is a perspective view of a spectrometer in accordance with yet another embodiment of the present invention.
Figure 5B:
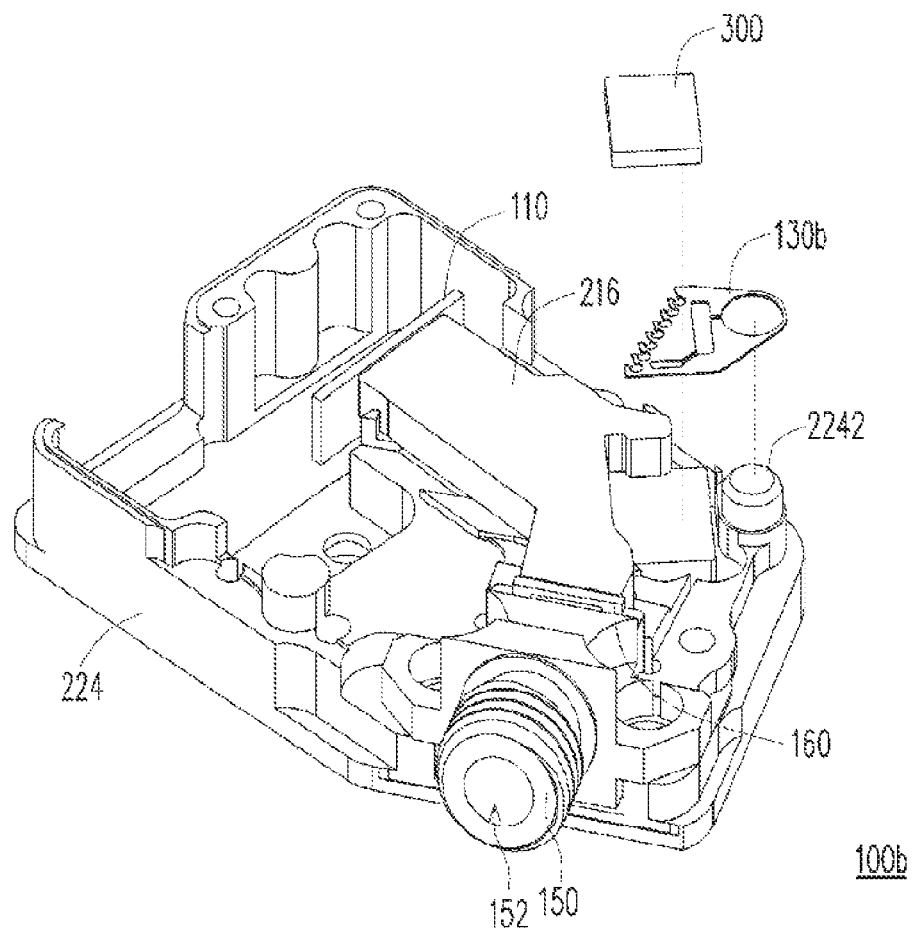
FIG. 5B is an exploded perspective view of the spectrometer of FIG. 5A.
Figure 5C:
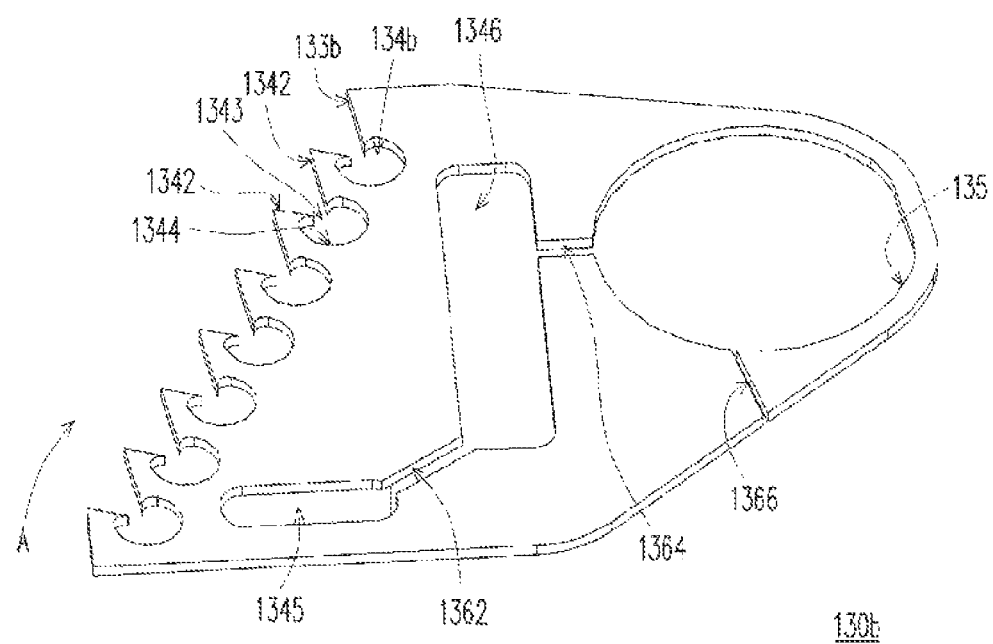
FIG. 5C is a perspective view of a heightening component of the spectrometer of FIG. 5A.

FIG. 5A is a perspective view of a spectrometer in accordance with yet another embodiment of the present invention. FIG. 5B is an exploded perspective view of the spectrometer of FIG. 5A. FIG. 5C is a perspective view of the heightening component of the spectrometer of FIG. 5A. Referring to FIGS. 5A-5C, the spectrometer 100*b* of the present embodiment is similar to the spectrometer 100 shown in the FIGS. 1A and 1B, and the major difference between the two is the difference between the heightening components 130*b* and 130. In FIGS. 5A and 5B, in order to allow the reader to clearly see the internal structure of the spectrometer 100*b*, the case 214 of the first base body 210 (shown in FIG. 1A) is removed. The shape of the reflective plate 216 in FIG. 5A may be used as a reference for the three-dimensional shapes of the reflective plates 216 and 226 in FIG. 1A, and the shape of the case 224 in FIG. 5A may be used as a reference for the three-dimensional shape of the case 224 in FIG. 1A. In the present embodiment, the case 224 may be produced by, for example, a computer numerical control (CNC) system. In the present embodiment, the heightening component 130*b* includes at least one light confinement groove 134*b* (FIG. 5C shows a plurality of light confinement grooves 134*b* as an example) located on a surface 133*b* of the heightening component 130*b* that faces the light channel C. The position of the surface 133*b* with respect to the light channel C is essentially identical to the position of the surface 133 of the heightening component 130 with respect to the light channel C in FIG. 1C. The difference between the surface 133*b* and the surface 133 is that the surface 133*b* has light confinement grooves 134*b* while the surface 133 is a flat surface. Therefore, similar to the heightening component 130, beside the surface 133*b* of the heightening component 130*b*, there is also a light output channel A. In the present embodiment, after passing through the light input port 120, a portion of the light L1 is diffracted by the diffractive surface 310, another portion of the light L1 exits the light channel C via the light output channel A, and the remaining portion of the light L1 is trapped by the light confinement groove(s) 134*b*.

Light L1 incident on the at least one light confinement groove 134*b* is repeatedly reflected by each of the at least one light confinement groove 134*b* and is confined within the at least one light confinement groove 134*b*. Specifically, each light confinement grooves 134*b* may have two opposed inclined guide surfaces 1342 connected by an annular-shaped reflective surface 1344 with a notch 1343 thereon. Light L1 incident on the surface 133*b* will be reflected by the inclined guide surfaces 1342 and enters into the space surrounded by the annular-shaped reflective surface 1344 via the notch 1343. Since the dimension of the notch 1343 is smaller than that of the space defined by the annular-shaped reflective surface 1344, light L1 in the space will be repeatedly reflected by the annular-shaped reflective surface 1344, making the escape of the light very difficult. Since every reflection will cause a slight attenuation of the light intensity, after multiple reflections light L1 will be absorbed by the annular-shaped reflective surface 1344 and disappear within the space. In this way, the light confinement groove(s) 134*b* can avoid formation of stray light, thus enhancing the quality of the spectra measured by the light sensor 110.

In the present embodiment, the heightening component 130*b* includes position reference marks 1345 and 1346, which can serve as the references for the relative position of the diffractive component 300 and the heightening component 130*b*. The position reference marks 1345 and 1346 may be openings. Specifically, as shown in FIG. 5A, when the diffractive component 300 is disposed on the heightening component 130*b*, an assembler can determine whether the diffractive component 300 is positioned correctly based on a ratio of the position reference marks 1345 and 1346 covered by the diffractive component 300. After the diffractive component 300 is determined to be in the correct position, the diffractive component 300 can be fixed, or otherwise secured, by an adhesive material. The adhesive material may be applied to the reflective plate 226 or the case 224 (please refer to FIG. 1A), situated below the openings (i.e., the position reference marks 1345 and 1346), through these openings, thereby fixing or securing the relative positions of the diffractive component 300, the heightening component 130*b*, and the second base body 220 (shown in FIG. 1A).

Furthermore, in the present embodiment, the reference marks 1345 and 1346 may extend in different directions such as, for example, in substantially mutually perpendicular directions. In this way, when judging whether the diffractive component 300 is correctly positioned, reference marks in two different directions can be used as the reference points. In addition, the heightening component 130*b* may include a positioning hole 135, and the case 224 may include a positioning unit 2242 such as, for example, a positioning post. When the heightening component 130*b* is disposed on the reflective plate 226, the positioning unit 2242 may be inserted in the positioning hole 135, for example, so that the positioning portion 2242 is tightly fit in the positioning hole 135. In this way, the heightening component 130*b* can be secured.

Figure 6:
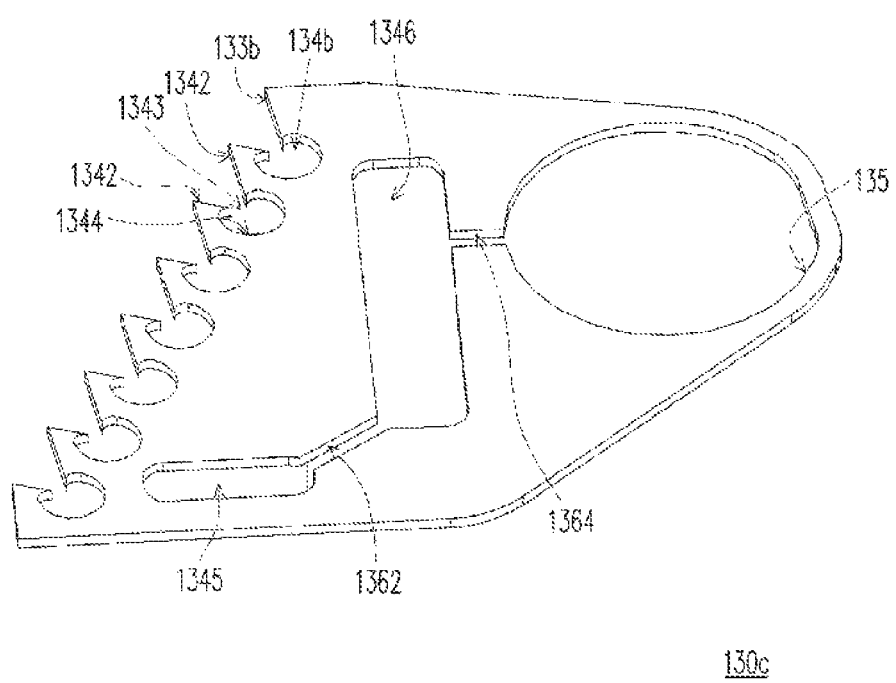
FIG. 6 is diagram of a variation of the heightening component of FIG. 5C.

In the present embodiment, the heightening component 130*b* also includes slits 1362, 1364 and 1366. The slit 1362 connects the reference mark 1345 to the reference mark 1346, and the slit 1364 connects the reference mark 1346 to the positioning hole 135. The slit 1366 extends through a side of the heightening component 130*b*, connecting the positioning hole 135 to the space outside the side of the heightening component 130*b*. As a result, the heightening component 130*b* can be formed simply by cutting once with a cutting tool when the heightening component 130*b* is formed by cutting a plate-shaped material. In addition, when the heightening component 130*b* is mounted on the positioning unit 2242 through the slit 1366, the positioning hole 135 can be slightly enlarged by the positioning unit 2242 so as to enable easy assembly of the heightening component 130*b* on the positioning unit 2242 while still maintaining the tight fit effect. In another embodiment, as shown in FIG. 6, the heightening component 130*c* may include slits 1362 and 1364, but not the slit 1366 of FIG. 5C. This design allows the heightening component 130*c* to be formed by cutting twice with the cutting tools. Alternatively, in other embodiments, no slits 1262 and 1364 are provided in the heightening component 130*c*, and accordingly the heightening component 130*c* may be formed by cutting multiple times.

Referring to FIGS. 5A to 5C again, the spectrometer 100*b* of the present embodiment also includes an adapter 150 and a mask component 160. The adapter 150 is configured to connect to one end of a light fiber while the other end of the light fiber receives the to-be-measured light L1 from the light source. When the light L1 is transmitted to the adapter 150 via the light fiber and then incident on the mask component 160 via an opening 152 of the adapter 150, a portion of the light L1 can be transmitted to the light channel C via the light input port 120 since the light input port 120 is formed on the mask component 160 (as shown in FIG. 1A, for example, as a slit). However, in other embodiments, there would be no adapter 150 in the spectrometer 100*b*. A portion of the light L1 to be measured is directly incident on the light input port 120, and then transmitted to the light channel C via the light input port 120.

Figure 7:
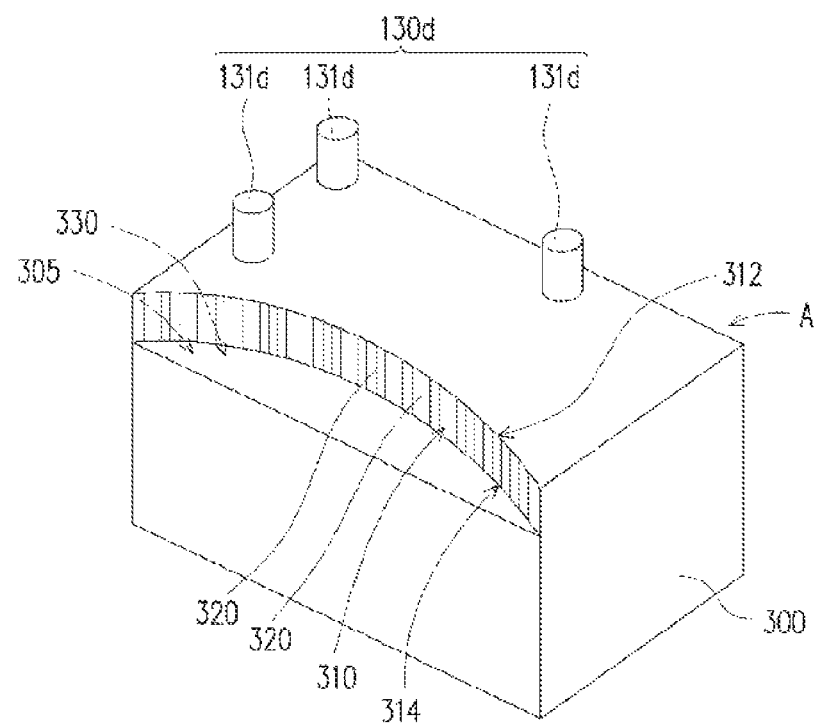
FIG. 7 is a perspective view of a diffractive component and a heightening component in accordance with another embodiment of the present invention.

FIG. 7 a perspective view of a diffractive component and a heightening component in accordance with another embodiment of the present invention. Referring to FIG. 7, the heightening component 130*d* of the present embodiment is similar to the heightening component 130 shown in FIG. 1C. Differences between the two are described below. In the spectrometer of the present embodiment, the heightening member 130*d* includes multiple spacers 131*d* that are spaced apart with respect to each other. These spacers 131*d* are located between the diffractive component 300 and the second base body 220. The spacers 131*d* may be transparent or light absorbing to reduce the formation of stray light. Moreover, these spacers 131*d* may be disposed on a part of the diffractive component 300 so as to form a light output channel A along a side of the spacers 131*d*, thereby reducing the formation of stray light.

Figure 8:
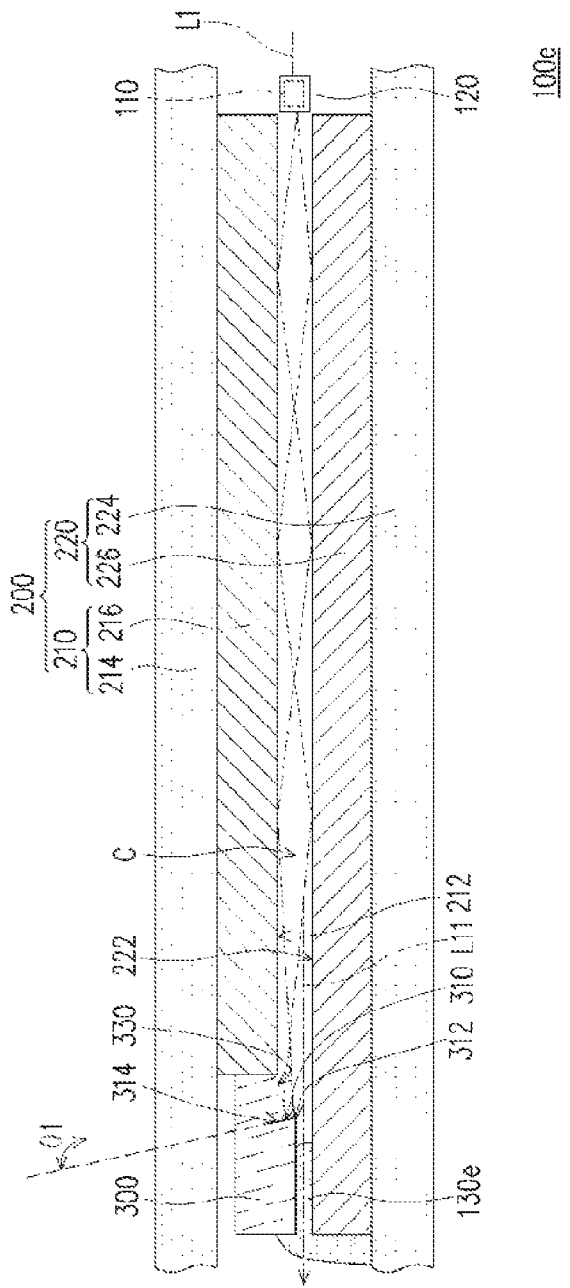
FIG. 8 is a side view of a spectrometer in accordance with still another embodiment of the present invention.

FIG. 8 is a side view of a spectrometer in accordance with still another embodiment of the present invention. Referring to FIG. 8, the spectrometer 100*e* of the present embodiment is similar to the spectrometer 100 shown in FIG. 1A. Differences between the two are described below. Referring to FIG. 8, unlike the spectrometer in FIG. 1A where the heightening component 130 is used to raise the height of the diffractive component 300, the spectrometer 100*e* of the present embodiment includes an adhesive material 130*e* that secures the diffractive component 300 to at least one of the first base body 210 and the second base body 220 (in the example shown in FIG. 8, the diffractive component 300 is secured to the second base body 220). In the present embodiment, the adhesive material 130*e* is, for example, adhesive glue. A part of the adhesive material 130e is provided between the diffractive component 300 and the reflective plate 226 so that the diffractive component 300 is attached to the reflective plate 226. In addition, another part of the adhesive material 130e is applied to the reflective plate 226, the case 224, and the diffractive component 300. The diffractive component 300 may be secured by the adhesive material 130e at a suitable height, so that the first side 312 of the diffractive surface 310 is positioned between the first reflective surface 212 and the second reflective surface 222 in a direction perpendicular to the second reflective surface 222. As a result, the diffraction effect of the diffractive component 300 is enhanced.

Figure 9:
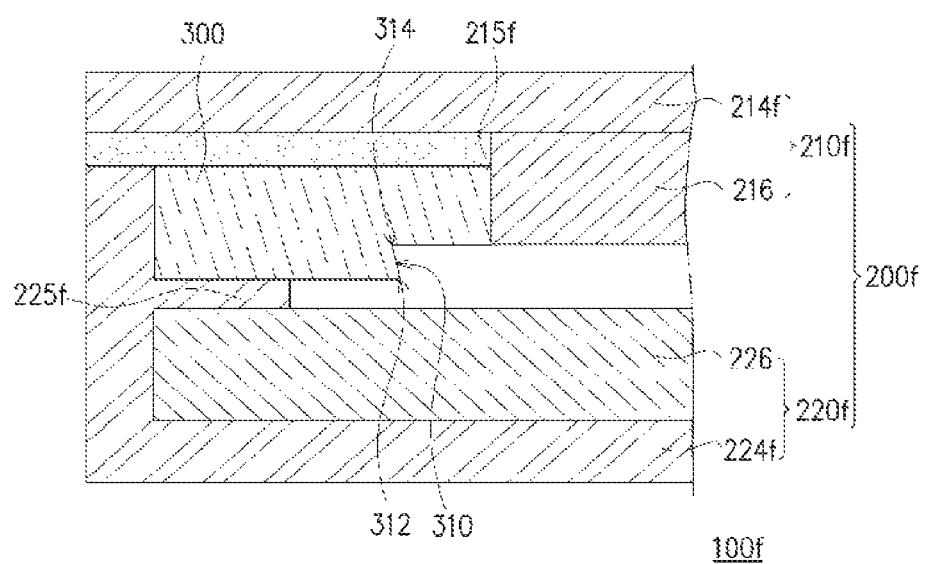
FIG. 9 is a partial side view of a spectrometer in accordance with another embodiment of the present invention.

FIG. 9 is a partial sectional side view of a spectrometer in accordance with another embodiment of the present invention. Referring to FIG. 9, the spectrometer 100f of the present embodiment is similar to the spectrometer 100 shown in FIG. 1A. Differences between the two are described below. In the present embodiment, at least one of the first base body 210f and the second base body 220f of the waveguide module 200f includes a fixing component (in the example shown in FIG. 9, the first base body 210f has a fixing component 215f on the case 214f and the second base body 220f has a fixing component 225f on the case 224f) to secure the position of the diffractive component 300. Specifically, the fixing component 215f and fixing component 225f may be, for example, convex portions. The diffractive component 300 may be held between the fixing component 225f and the elastic fixing component 215f disposed on the case 214 to achieve the effect of securing the diffractive component 300. In the present embodiment, the fixing component 215f is made of, for example, elastic silicone. The diffractive component 300 is fixed to a suitable height by the elastic fixing component 215f and the fixing component 225f such that the first side 312 of the diffractive surface 310 is positioned between the first reflective surface 212 and the second reflective surface 222 in a direction perpendicular to the second reflective surface 222 with a spacing or gap maintained between the first side 312 of the diffractive surface 310 and the second reflective surface 222. This design enhances the diffraction effect of the diffractive component 300.

In other embodiments, the fixing component may be provided on the first base body 210f instead and not on the second base body 220f, or each of the first base body 210f and the second base body 220f is respectively provided with a fixing component, so that the diffractive component 300 can be fixed to a suitable height to enhance the diffraction effect. In addition, in other embodiments, other components or structures may be adopted to secure the diffractive component 300 to a suitable height so that the first side 312 of the diffractive surface 310 is positioned between the first reflective surface 212 and the second reflective surface 222 in a direction perpendicular to the second reflective surface 222. These components and structures are all within the scope of protection of the present invention.

Figure 10:
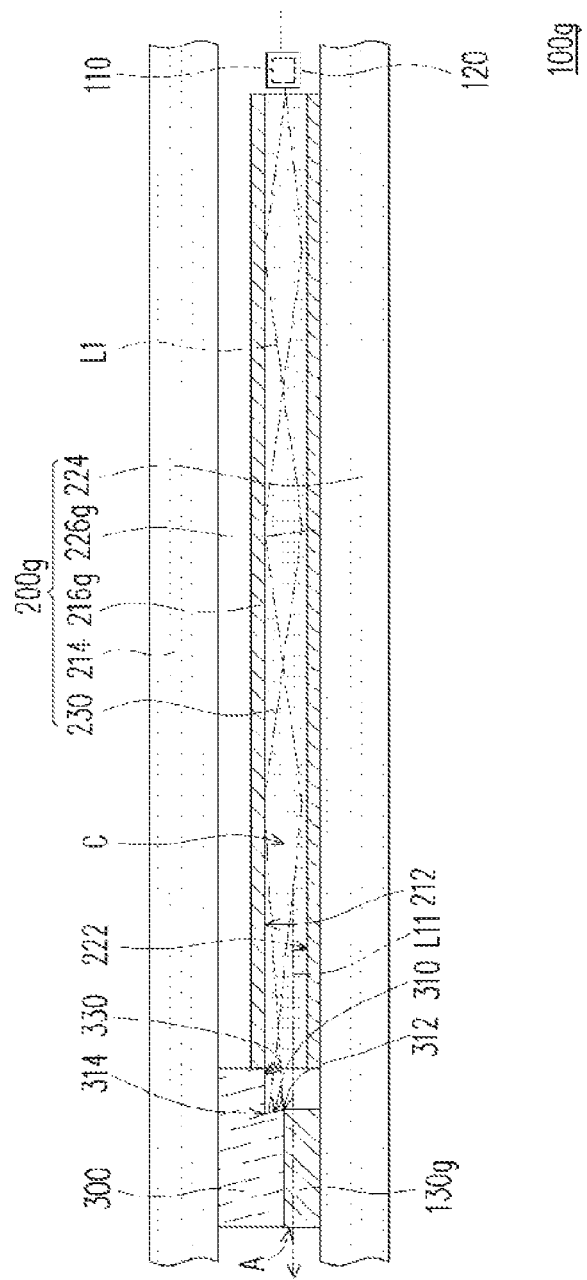
FIG. 10 is a side view of a spectrometer in accordance with yet another embodiment of the present invention.

FIG. 10 a side view of a spectrometer in accordance with yet another embodiment of the present invention. Referring to FIG. 10, the spectrometer 100g of the present embodiment is similar to the spectrometer 100 shown in FIG. 1A. Differences between the two are described below. Referring to FIG. 10, the waveguide module 200g of the spectrometer 100g in the present embodiment includes a light guiding body 230, a first reflective film 216g, and a second reflective film 226g. The light guiding body 230 forms a light channel C. The first reflective film 216g is disposed on the light guiding body 230, and the second reflective film 226g is disposed on the light guiding body 230. The light guiding body 230 is disposed between the first reflective film 216 and the second reflective film 226. An interface between the first reflective film 216g and the light guiding body 230 forms the first reflective surface 212, and an interface between the second reflective film 226g and the light guiding body 230 forms the second reflective surface 222. The light guiding body 230 is made of, for example, a transparent material such that light L1 can be transmitted within the light guiding body 230 and continuously reflected by the first reflective film 216g and the second reflective film 226g. The first reflective film 216g and the second reflective film 226g may be, for example, a metal coated film or a non-metal coated film. In other words, the light guiding body 230, the first reflective film 216g, and the second reflective film 226g together form a solid waveguide. In other embodiments, the waveguide module 200g may include a light guiding body that can guide light by total reflection, and Light L1 can be transmitted within the light guiding body through total internal reflection. As a result, there is no need to form reflective films by further processing.

In the present embodiment, the heightening component 130g is disposed on the case 224 to locate the diffractive component 300 at a suitable height, and to allow the first side 312 of the diffractive surface 310 to be positioned between the first reflective surface 212 and the second reflective surface 222 in a direction perpendicular to the second reflective surface 222. As a result, the diffraction effect of the diffractive component 300 is enhanced. In other embodiments, an adhesive material, a fixing component on the case 214 or case 224, or any other component or structure on which the diffractive component 300 can be secured may be employed to position the first side 312 of the diffractive surface 310 between the first reflective surface 212 and the second reflective surface 222 in a direction perpendicular to the second reflective surface 222.

Figure 11:
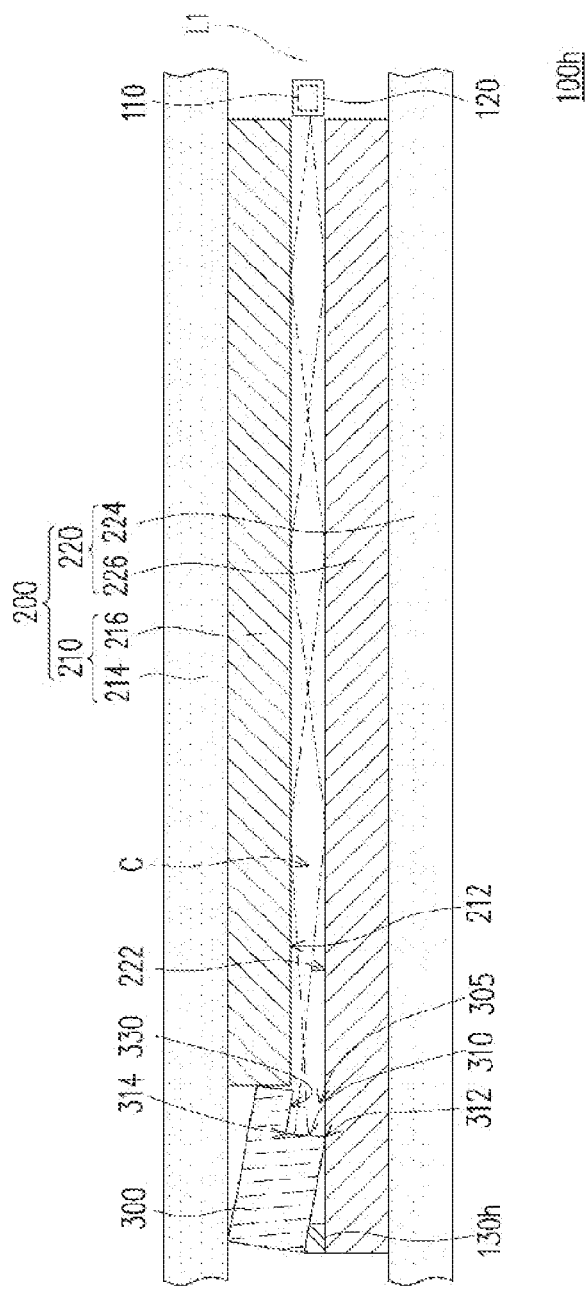
FIG. 11 is a side view of a spectrometer in accordance with still another embodiment of the present invention.

FIG. 11 is a side view of a spectrometer in accordance with still another embodiment of the present invention. Referring to FIG. 11, the spectrometer 100h of the present embodiment is similar to the spectrometer 100 disclosed in FIG. 1A. Differences between the two are described below. In the present embodiment, the diffractive surface 310 of the notch 305 on the diffractive component 300 of the spectrometer 100h is inclined relative to the bottom surface 330. Specifically, when a semiconductor material is etched using the semiconductor etching process, the processing conditions may result in an undercut, thus the bottom surface 330 becomes the end surface of etching. As a result, the diffractive surface 310 will be inclined relative to the bottom surface 330. In the present embodiment, the bottom surface 330 is inclined relative to the second reflective surface 222 so that the diffractive surface 310 is generally parallel with the normal vector of the second reflective surface 222. Specifically, when the undercut occurs, the diffractive surface 310 is not perpendicular to the second reflective surface 222. In order to have the diffractive surface 310 positioned nearly perpendicular to the second reflective surface 222, the diffractive components 300 is tilted, i.e., the bottom surface 330 is tilted. In this way, light L1 can be incident on the diffractive surface 310 approximately perpendicularly. As a result, the diffraction effect (i.e., resolution) can be enhanced.

In the present embodiment, the heightening member 130h may be disposed between the diffractive component 300 and the second base body 220 and away from one side of the diffractive surface 310 of the diffractive component 300, i.e., below the end of the diffractive component 300. In this way, the end of the diffractive component 300 will be raised up to tilt the bottom surface 330 and to position the diffractive surface 310 nearly vertically.

Figure 12:
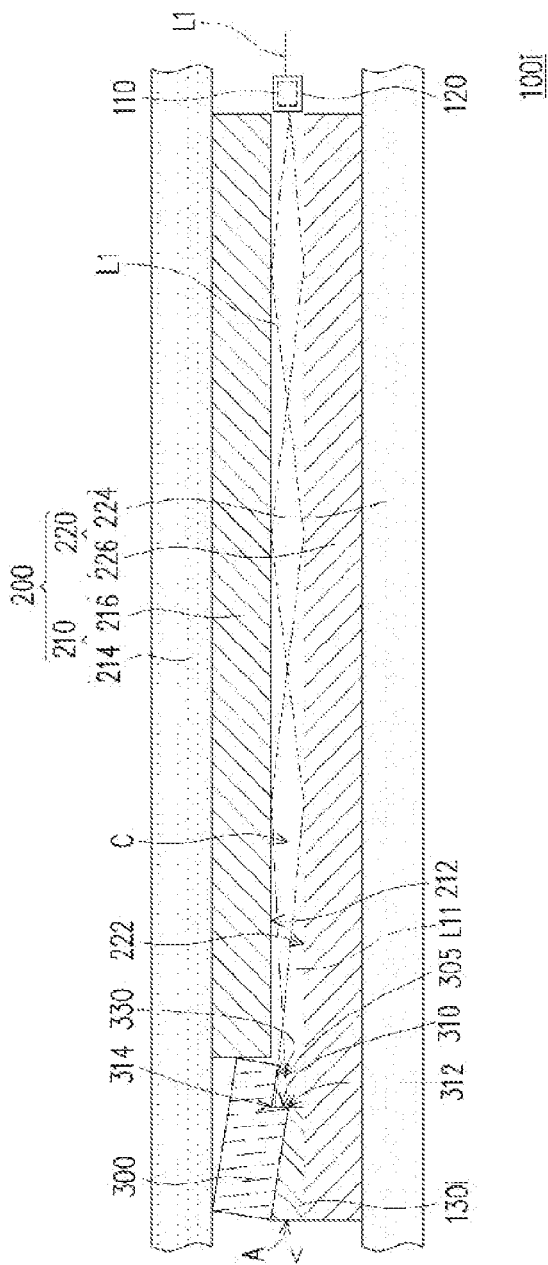
FIG. 12 is a side view of a spectrometer in accordance with another embodiment of the present invention.

FIG. 12 is a side view of a spectrometer in accordance with another embodiment of the present invention. Referring to FIG. 12, the spectrometer 100i of the present embodiment is similar to the spectrometer 100h disclosed in FIG. 11. Differences between the two are described below. In the present embodiment, except that the diffractive surface 310 of the notch 305 on the diffractive component 300 of the spectrometer 100i is inclined relative to the bottom surface 330, the first side 312 of the diffractive surface 310 is also located between the first reflective surface 212 and the second reflective surface 222 in a direction perpendicular to the second reflective surface 222. Thus, in addition to the fact that light L1 may be perpendicularly incident on the diffractive surface 310, a portion of the light L1 with higher intensity may be incident on the portion of the strip-shaped diffractive structures 320 with sharper profile (as shown in FIG. 1C). In this way, the diffractive surface 310 can better diffract light L1 and enhance the optical quality of the resulting spectra.

In the present embodiment, the heightening component 130i not only increases the height of the diffractive component 300 but also tilts the diffractive component 300. For example, one side of the heightening component 130i that is further away from the diffractive surface 310 has a thickness greater than the other side that is closer to the diffractive surface 310, thus achieving heightening and tilting effects at the same time.

In addition to utilizing the heightening component 130h of FIG. 11 and the heightening component 130i of FIG. 12 as described above to set the diffractive component 300 at an optimal position and angle, in other embodiments, an adhesive material or other components or structures may also be used to adjust the position and angle of the diffractive component.

Figure 13A:
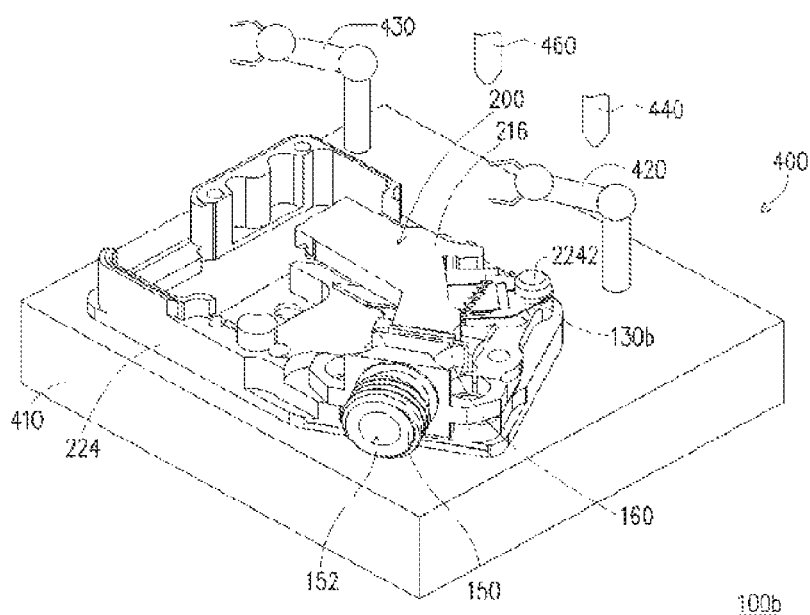
FIGS. 13A to 13E are diagrams illustrating an assembling system in accordance with one embodiment of the present invention to explain the associated assembling procedure.
Figure 13B:
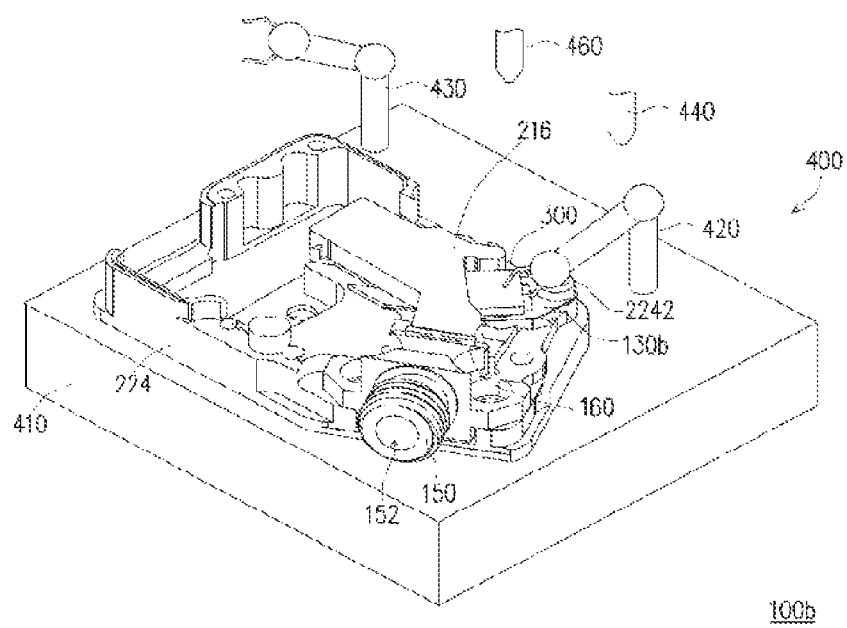
Figure 13C:
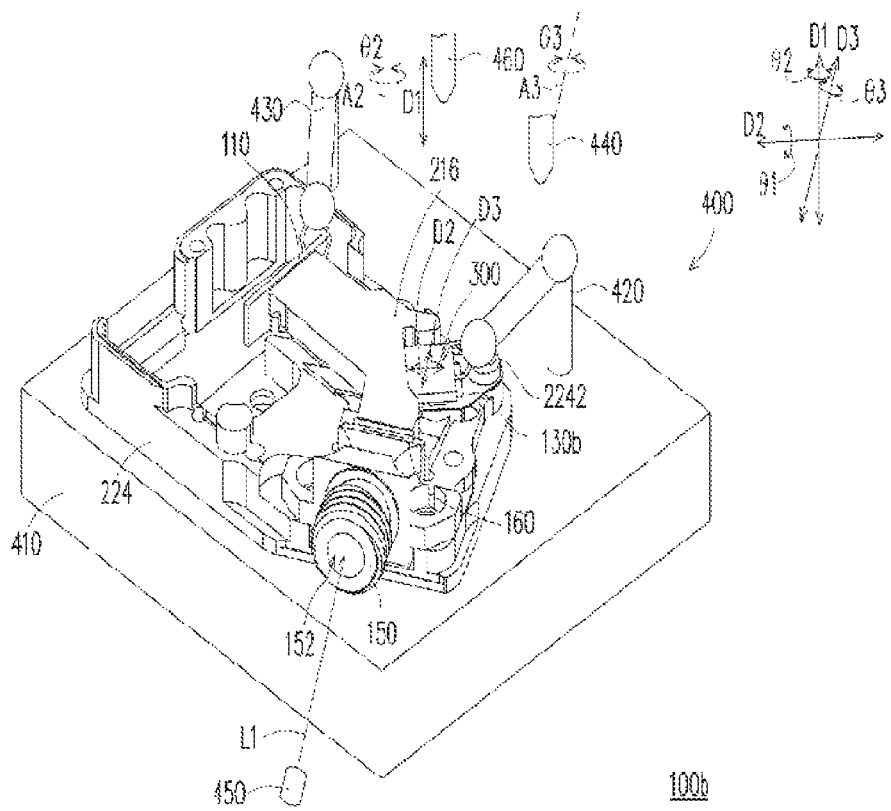

FIGS. 13A to 13E are diagrams illustrating an assembling system in accordance with one embodiment of the present invention to explain the associated assembling procedure. Referring to FIGS. 13A to 13E, the assembling method in the present embodiment can be used to assemble the spectrometer 100e as shown in FIG. 8 or other spectrometers described above. Hereafter, the assembly of the spectrometer 100e disclosed in FIG. 8 is described as an example. The method for assembling a spectrometer in the present embodiment includes the following steps. First, as shown in FIG. 13A, a waveguide module 200 is provided. For example, a carrier 410 in an assembling system 400 may be used to carry the waveguide module 200. Then, as shown in FIG. 13B, the diffractive component 300 is disposed adjacent to the light channel C (as shown in FIG. 1A), for example, by a first fixture 420 in the assembling system 400. Next, as shown in FIG. 13C, the light sensor 110 is disposed on one end of the light channel C, for example, by a second fixture 430 in the assembling system 400. Thereafter, light L1 is transmitted to the diffractive surface 310 via the light channel C such that at least a portion of the light L1 is diffracted by the diffractive surface 310 and then transmitted to the light sensor 110. For example, light L1 from a light source 450 is transmitted to the diffractive surface 310 after passing through the light input port 120 and the light channel C sequentially. In the present embodiment, the light source 450 may be a standard lamp of known spectral radiance and/or intensity.

Then, either or both the position of the diffractive surface 310 along a direction substantially perpendicular to the second reflective surface 222 (e.g., direction D1) and an angle .theta.1 between the diffractive surface 310 and the second reflective surface 222 (as shown in FIG. 8) is adjusted, and the corresponding spectrum of the light L1 incident on the light sensor 110 is measured. For example, the first fixture 420 may be used to adjust either or both the position of the diffractive surface 310 along a direction substantially perpendicular to the second reflective surface 222 and angle .theta.1 between the diffractive surface 310 and the second reflective surface 222. The first fixture 420 may achieve this effect by shifting or rotating the diffractive component 300.

In the present embodiment, the first fixture 420 may also be used to adjust the position of the diffractive surface 310 along a direction that is substantially parallel to the second reflective surface 222 and substantially perpendicular to a straight line connecting the light input port 120 (as shown in FIG. 1A) and the diffractive surface (e.g., direction D2). The light input port 120 is provided on one end the waveguide module 200, for example, on the mask component 160. Moreover, in the present embodiment, the first fixture 420 may also be used to adjust the distance between the diffractive surface 310 and the light input port 120 (e.g., a distance along a direction parallel to direction D3). Moreover, in the present embodiment, the first fixture 420 may be used to adjust a first rotation angle .theta.2 of the diffractive surface of 310. The first rotation angle .theta.2 is defined as an angle around an axis A2 that is substantially parallel to the normal vector of the second reflective surface 222. Furthermore, in the present embodiment, the first fixture 420 may be used to adjust a second rotation angle .theta.3 of the diffractive surface 310. The second rotation angle .theta.3 is defined as an angle around an axis A3 that is substantially parallel to a straight line connecting the light input port 120 and the diffractive surface 310.

In this way, the first fixture 420 may adjust not only the position of the diffractive surface 310 in three directions D1, D2 and D3, but also the angle .theta.1, the first rotation angle .theta.2, and the second rotation angle .theta.3 of the diffractive surface 310. Accordingly, the first fixture 420 is capable of performing six-axis adjustments to the diffractive component 300.

Figure 13D:
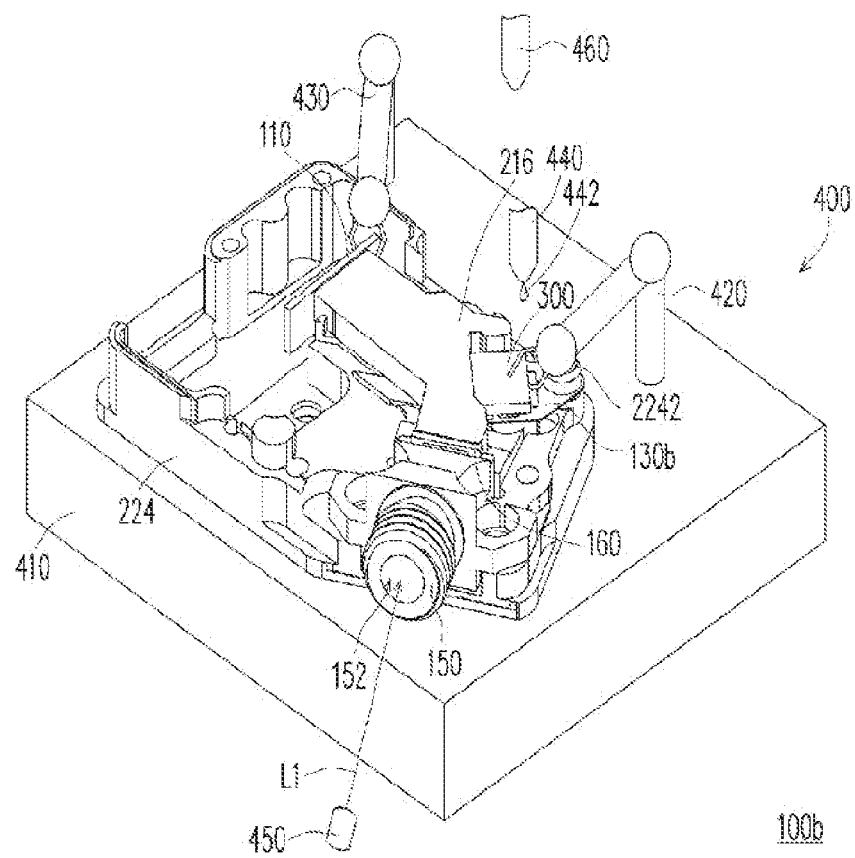
Figure 13E:
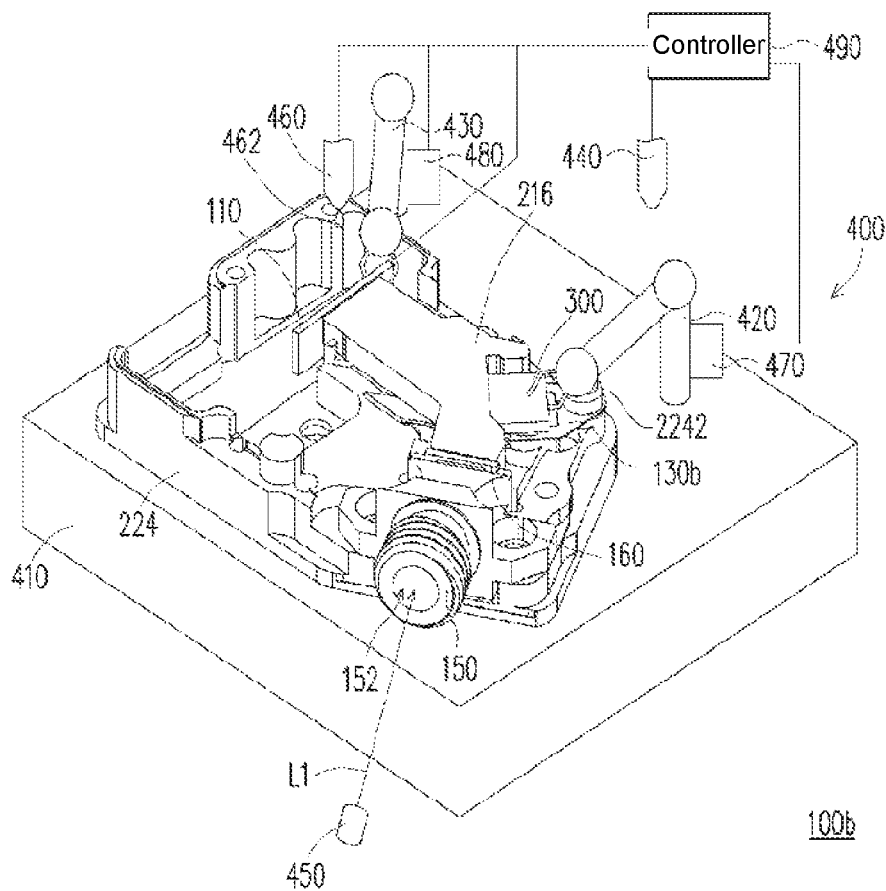

Afterwards, referring to FIG. 13D, it is determined whether the spectrum of the light L1 measured by the light sensor 110 meets a predefined first sharpness condition. If the spectrum of the light L1 measured by the light sensor 110 meets the predefined first sharpness condition, the diffractive component 300 is secured. Otherwise, at least one of position and angle of the diffractive surface 310 will be adjusted until the first sharpness condition is met. Specifically, whether the spectrum meets the predefined first sharpness condition is determined by a controller 490 (as shown in FIG. 13E). When the spectrum meets the predefined first sharpness condition, an adhesive material 442 is applied to the diffractive component 300 by an adhesive dispenser 440 in the assembling system 400 so as to fix or secure the diffractive component 300 on at least one of the first base body 210 and the second base body 220. FIG. 13D shows the example of the diffractive component 300 being fixed on the reflective plate 226 of the second base body 220. In the present embodiment, the adhesive dispenser 440 is controlled, for example, by the controller 490. In addition, in the present embodiment, the predefined first sharpness condition may be, for example, a predefined spectral sensitivity or a predefined spectral resolution having a value greater than a preset threshold within a specified wavelength range.

Furthermore, in the present embodiment, the position and the angle used to obtain the spectrum in a previous measurement may be used to determine the adjustment of at least one of the position and angle of the diffractive surface 310 in a current measurement.

Next, referring to FIG. 13E, after the diffractive component 300 is secured, either or both of position and angle of the light sensor 110 relative to the light channel C is adjusted, and the corresponding spectrum of the light L1 incident on the light sensor 110 is measured. Subsequently, it is determined whether the spectrum of the light L1 incident on the light sensor 110 meets a predefined second sharpness condition. If the condition is met, the light sensor 110 is secured. Otherwise, the adjustment of either or both of position and angle of the light sensor 110 relative to the light channel C will be continued until the condition is met. In the present embodiment, the predefined second sharpness condition may be, for example, a predefined spectral sensitivity or a predefined spectral resolution having a value greater than a preset threshold within a specified wavelength range. The first sharpness condition and the second sharpness condition may be the same or different depending on the requirements.

Specifically, either or both of position and angle of the light sensor 110 can be adjusted by a second fixture 430 that is similar to the first fixture 420. Moreover, in the present embodiment, the second fixture 430 can move the light sensor 110 in three directions, namely a direction parallel to the light channel C, a direction perpendicular to the light channel C and the second reflective surface 222, and a direction perpendicular to the light channel C but parallel to the second reflective surface 222. Alternatively, the second fixture 430 can rotate the light sensor 110 around three rotation axes, namely a rotation axis parallel to the light channel C, a rotation axis perpendicular to the light channel C and the second reflective surface 222, and a rotation axis perpendicular to the light channel C but parallel to the second reflective surface 222. In other words, in the present embodiment, the second fixture 430 is capable of performing six-axis adjustments to adjust the position of the light sensor 100. Furthermore, in the present embodiment, when the spectrum measured by the light sensor 110 meets the second sharpness condition, an adhesive material 462 is applied to the light sensor 110 by the adhesive dispenser 460 in the assembling system 400 so as to secure the light sensor 110 on one end of the light channel C, for example, on one or both of the first base body 210 and the second base body 220.

Referring to FIG. 13E, the assembling system 400 further includes a first actuator 470, a second actuator 480, and a controller 490. The first actuator 470 drives the first fixture 420, and the second actuator 480 drives the second fixture 430. The controller 490 is electrically connected to the first actuator 470 and the second actuator 480 to control the actions of the first actuator 470 and the second actuator 480. In other words, the first actuator 470 and the second actuator 480 can drive the first fixture 420 and the second fixture 430, respectively, to adjust positions and angles of the diffractive component 300 and the light sensor 110, respectively. Moreover, the way that the first actuator 470 drives the first fixture 420 and that the second actuator 480 drives the second fixture 430 is subject to the control of the controller 490. The controller 490 is, for example, a control chip, a processor, a computer, or another appropriate controller.

In the present embodiment, the controller 490 is electrically connected to the light sensor 110 and the adhesive dispensers 440 and 460. The light sensor 110 sends signals of measured spectral back to the controller 490. The controller 490 determines either or both of the position and angle of the diffractive component 300, as well as either or both of the position and angle of the light sensor 110, based on these spectral signals. The controller 490, through a determination process, determines whether the sharpness of the spectral signals measured by the light sensor 110 meets preset standards (e.g., the first sharpness condition and the second sharpness condition). When the standards are met, the controller 490 commands the adhesive dispenser 440 to apply the adhesive material onto the diffractive component 300. Otherwise, the controller 490 commands the first actuator 470 and second actuator 480 to adjust either or both of the position and angle of the diffractive component 300, or either or both of the position and angle of the light sensor 110, until the sharpness of the spectral signals meets the standards.

In addition, in the present embodiment, the controller 490 may also be electrically connected to the adhesive dispenser 460. When the controller 490 determines that the spectrum measured by the light sensor 110 meets the second sharpness condition, the controller 490 commands the adhesive dispenser 460 to apply the adhesive material onto the light sensor 110 so as to secure the position and angle of the light sensor 110.

After the diffractive component 300 and the light sensor 110 are secured with the adhesive material using the procedures described above, the first side 312 of the diffractive surface 310 is positioned between the first reflective surface 212 and the second reflective surface 222 in a direction perpendicular to the second reflective surface 222 with a spacing or gap maintained between the second reflective surface 222 and the first side 312. Alternatively, the diffractive surface 310 is positioned to be substantially parallel with the normal vector of the second reflective surface 222. Alternatively, the diffractive surface 310 is positioned in the above-mentioned two positions simultaneously. Thus, a spectrometer having good spectral qualities can be obtained, according to the assembling method and the assembling system 400, such as the spectrometer 100e, for example, and variations thereof (such as the one with an inclined bottom surface 330) may be obtained.

In the present embodiment, the example given involves securing the light sensor 110 after the diffractive component 300 is secured. However, in another embodiment, the diffractive component 300 and the light sensor 110 may be secured with the adhesive material after positions of both the diffractive component 300 and the light sensor 110 has been adjusted (i.e., both of the first sharpness condition and the second sharpness condition are met, where the first sharpness condition and the second sharpness condition may be the same or different). During the adjustment of the positions of the diffractive component 300 and the light sensor 110, various combinations of the relative positions of the diffractive component 300 and the light sensor 110 may be generated. The controller 490 may store the information related to the spectral senility, the spectral resolution and the ratio of stray light of the spectra of these combinations measured by the light detector 110 in a data storage medium. In addition, the controller 490 may select one or more of the combinations having optimal spectral signals, so that in subsequent assemblies, the controller 490 may first position the diffractive component 300 and the light sensor 110 at specific positions according to the one or more selected combinations. Alternatively, the controller 490 may perform an interpolative estimation of the positions of the diffractive component 300 and the light sensor 110 in advance according to these combinations, thus effectively shortening the assembly time.

The description above pertains to an example of an automatic mode through which the positions of the diffractive component 300 and the light sensor 110 are adjusted. However, in other embodiments, positions of the diffractive component 300 and the light sensor 110 may also be adjusted manually. When manual adjustment is adopted, the first fixture 420 and the second fixture 430 are replaced by manually-operated fixtures. The manually-operated fixtures may include at least one sliding rail and at least one rotating lever. In the present embodiment, when the position of the diffractive component 300 or the light sensor 110 is to be adjusted along the six axes, the first fixture 420 may be replaced with three sliding rails and three rotating levels, and the second fixture 430 may also be replace with three sliding rails and three rotating levels. For example, the three sliding rails may be used to adjust the positions of the diffractive surface 310 along three directions D1, D2, and D3, respectively, while the three rotating levers can be used to adjust the angle .theta.1, the first rotation angle .theta.2, and the second rotation angle .theta.3 of the diffractive surface 310, respectively.

In addition, when manual adjustment is used, an example illustrating a method to adjust the light sensor 110 and determine whether the spectrum meets the predefined sharpness condition is described below. Firstly, a mercury lamp may be used as the light source 450. Then, the position of the light sensor 110 is adjusted along a direction perpendicular to the second reflective surface 222 and the light channel C by observing whether the peak of the spectrum is long and thin. When the peak value reaches the highest and the peak shape becomes the longest and the thinnest, the light sensor 110 will be set at this position. The peak value is the number of counts of the spectrum representing the light energy received by the light sensor 110. When the light sensor 110 continuously receives the light L1 within an integrated time period, the number of counts will be increased as time elapses. Therefore, the determination of whether the peak value reaches the highest is based on whether the number of counts of the peak value reaches the maximum with respect to those at other wavelengths. In other words, the number of counts of the spectrum can be viewed as the relative intensity of light at different wavelengths.

Next, the position of the light sensor 110 is adjusted along a direction substantially parallel to the light channel C, i.e., the distance between the light sensor 110 and the diffractive component 300 is adjusted. After the peak value of each wavelength in the spectrum becomes the largest and at the same time the peak shape at each wavelength becomes elongated, and before some of the peak values increase and some of the peak values decrease, the light sensor 110 is set at this position.

Afterwards, the position of the light sensor 110 is secured. In this way, the light sensor 110 can be secured at a position with a relatively better spectral resolution and a relatively high peak value. The same procedure may be followed to move or rotate the light sensor 110 along or around other directions.

Moreover, the above-described procedure for adjusting the position of the light sensor 110 and determining whether a sharper spectrum is obtained may be applied to the diffractive component 300. Furthermore, in order to shorten the assembly time, the diffractive component may also be first moved or rotated to a limited number of specified positions based on prior adjustments, and then the sharpness of each of corresponding spectra is determined. The diffractive component 300 is then secured at one position with the sharpest spectrum. In this way, the diffractive component 300 only needs to be adjusted at fewer positions and angles to observe the corresponding spectra rather than being continuously adjusted at various positions and angles during observation of the spectra. By doing so, assembly time can be effectively shortened. In other words, the position and the angle of the diffractive component 300 only need to be roughly adjusted. After the diffractive component 300 is secured, the position and angle of the light sensor 110 are fine-tuned. Accordingly, the spectrum with high spectral quality can still be obtained.

After the light sensor 110 is secured, a halogen lamp may be used as the light source 450, and some wavelengths of the light L1 measurable by the light sensor 110 may be filtered out by the filter. Next, the number of counts of those wavelengths being filtered out may be compared to the number of counts of unfiltered wavelengths, and the ratio of these counts may be used to determine the influence of stray light on the light sensor 110. A larger ratio normally indicates a greater effect of stray light.

Next, a light source with calibrated intensity of light may be used as the light source 450, which may be used to calibrate the intensity of light measured by the light sensor 110.

Figure 14A:
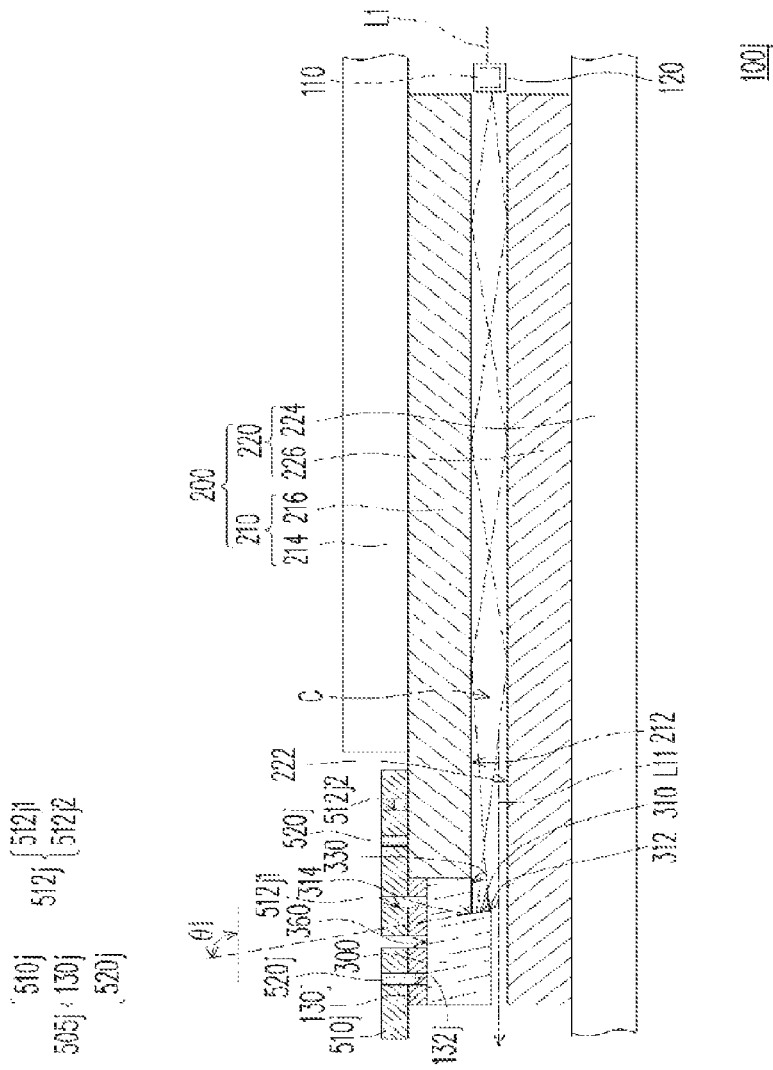
FIG. 14A is a side view of a spectrometer in accordance with a further embodiment of the present invention.
Figure 14B:
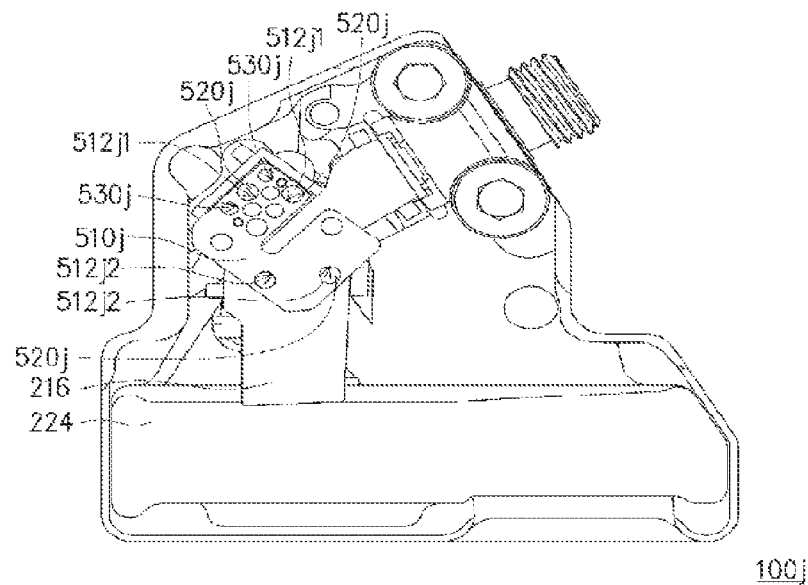
FIG. 14B is a top view of the spectrometer of FIG. 14A after a case 214 is removed.
Figure 14C:
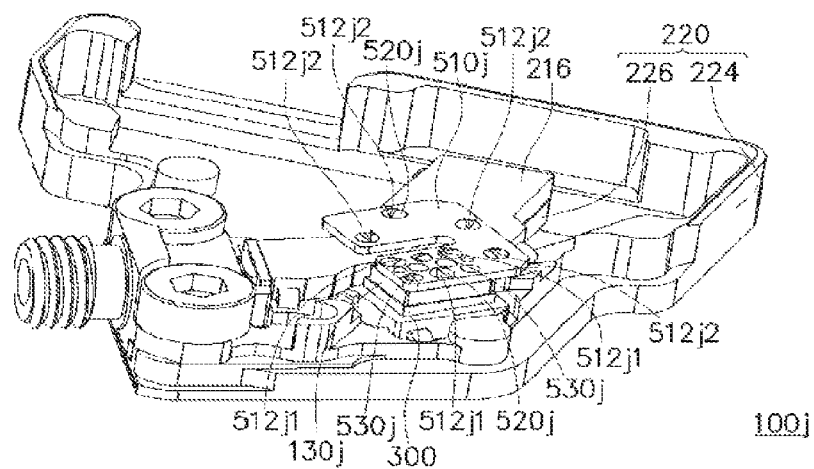
FIG. 14C is a perspective view of the spectrometer of FIG. 14A after the case 214 is removed.

FIG. 14A is a side view of a spectrometer in accordance with a further embodiment of the present invention. FIG. 14B is a top view of the spectrometer of FIG. 14A with the case 214 removed. FIG. 14C is a perspective view of the spectrometer of FIG. 14A with the case 214 removed. Referring to FIGS. 14A to 14C, the spectrometer 100j of the present embodiment is similar to the spectrometer 100 shown in FIG. 1A. Differences between the two are described below. In the present embodiment, the spectrometer 100j also includes a connecting unit 505j connecting the diffractive component 300 to the first base body 210. Since the diffractive component 300 is connected to the first base body 210 by the connecting unit 505j, when temperature changes of the spectrometer 100j result in deformation (e.g., increase in width and length) of the first base body 210, changes will also occur on the diffractive component 300 through the connecting unit 550j. When the position of the diffractive component 300 changes with the deformation of the first base body 210, the connection between the diffractive component 300 and the first base body 210 or the strength of the connection is less susceptible to thermal stress. In this way, the reliability and durability of the spectrometer 100j can be effectively improved.

In the present embodiment, the connecting unit 505j connects the diffractive component 300 to the reflective plate 216. When temperature changes cause deformation of the reflective plate 216 of the spectrometer 100j, changes will also occur on the diffractive component 300 via the connecting unit 505j. When the position of the diffractive component 300 changes with the deformation of the reflective plate 216, the connection between the diffractive component 300 and the reflective plate 216 or the strength of the connection is less susceptible to damage by thermal stress.

In the present embodiment, the connecting unit 505j includes a fixing component 510j and multiple pieces of an adhesive material 520j. The fixing component 510j, having multiple first through holes 512j, is disposed on the first base body 210. A first portion 512j1 of the first through hole 512j exposes a part of the diffractive component 300, and a second portion 512j2 of the first through holes 512j exposes a part of the first base body 210 (in the present embodiment, a part of the reflective plate 216 is exposed; in other embodiments, a part of the case 214 may be exposed). The first through holes 512*j* are filled with the adhesive material 520*j*. The adhesive material 520*j* in the first portion 512*j*1 of the first through holes 520*j* connects the fixing component 510*j* to the diffractive component 300, while the adhesive material 520*j* in the second portion 512*j*2 of the first through holes connects the fixing component 510*j* to the first base body 210. In the present embodiment, the fixing component 510*j* is, for example, a fixing plate disposed on the reflective plate 216. However, in other embodiments, the fixing plate 510*j* may be disposed on the case 214.

In the present embodiment, the connecting unit 505*j* also includes a gasket 130*j*, which has at least one second through hole 132*j*, located between the diffractive component 300 and the fixing component 510*j* (in the example of FIG. 14A multiple second through holes 132*j* are shown). Each of the second through holes 132*j* is interlinked with a corresponding first through hole 512*j*1. Some of the pieces of the adhesive material 520*j* are filled in the first through holes 512*j*1 and the second through holes 132*j* to connect the fixing component 510*j*, the gasket 130*j*, and the diffractive component 300 together.

In the present embodiment, the first through holes 512*j*1 are distributed at different locations, and the quantity of the first through holes 512*j*1 is at least three. This allows the adhesive material 520*j* filled in the first through holes to provide a better control over the degree in which the diffractive component 300 is leveled horizontally or inclined. However, in other embodiments, one first through hole 512*j*1 is provided.

In addition, in the present embodiment, the connecting unit 505*j* may include at least one positioning hole 530*j* (in the example of FIG. 14C multiple positioning holes 530*j* are shown) extending through the diffractive component 300 and the gasket 130*j*, and exposing a part of the upper surface 360 of the diffractive component 300. When using the adhesive material 520*j* to secure the diffractive component 300, a gasket is disposed between the reflective plate 226 and the diffractive component 300 first, and then the fixture is abutted against the surface 360 of the diffractive component 300 through the positioning hole 530*j* so as to temporarily secure the position of the diffractive component 300. Subsequently, the adhesive material 520*j* is filled into the first through hole 512*j*1 and the second through hole 132*j*. The diffractive component 300 is secured after the adhesive material 520*j* is cured. At this point, the gasket is removed from the reflective plate 226 and the diffractive component 300; meanwhile, the fixture may also be removed from the positioning hole 530*j*.

In this way, the diffractive component 300 is secured above the second base body 220 with a spacing or gap in between. By doing so, stray light can exit the spectrometer 100*j* through the spacing between the diffractive component 300 and the second base body 220. It noteworthy that in the present embodiment, the allocation surface 350 of the diffractive component 300 facing the reflective plate 226 may be coated with a reflective material to form a mirror. As a result, stray light can more easily exit the spectrometer 100*j* via the spacing between the diffractive component 300 and second base body 220. In other words, in the present embodiment, the positioning may be achieved by the fixing component 510*j*, the gasket 130*j* and the adhesive material 520*j*. The position and the degree of inclination of the diffractive surface 310 may be controlled by the thickness and the degree of inclination of the lower surface of the gasket 130*j*, respectively.

In the present embodiment, the fixing component 510*j*, the gasket 130*j* and the reflective plate 216 are made of metal such as, for example, aluminum. The adhesive material 520*j* is, for example, a UV curable adhesive, an AB glue or another adhesive material. Because the thermal expansion coefficient of metal is smaller than that of the adhesive material, when the adhesive material 520*j* is attached to the inner walls of the first through hole 512*j*1 and the second through hole 132*j*, the expansions of the fixing component 510*j* and the gasket 130*j* under heat are smaller. As a result, the fixing component 510*j* and the gasket 130*j* can effectively limit the expansion of the adhesive material 520*j*. In this way, the height of the diffractive component 300 in a direction perpendicular to the first reflective surface 212 is less susceptible to ambient temperature changes.

In the present embodiment, the fixing component 510*j* and the reflective plate 216 may be made of the same material or different materials as long as the thermal expansion coefficients of the fixing component 510*j* and the reflective plate 216 are substantially the same. Thus, when the length or the width of the reflective plate 216 increases due to ambient temperature changes, the fixing component 510*j* can react to these changes, thereby producing a corresponding deformation. As a result, the position of the diffractive component 300 is changed correspondingly to minimize possible damage due to thermal stress caused by the connection between the diffractive component 300 and the reflective plate 216. However, in other embodiments, the thermal expansion coefficient of the fixing component 510*j* may be different from that of the reflective plate 216.

In other embodiments, when the diffractive component 300 is thick enough, no gasket 130*j* is needed. The diffractive component 300 may be abutted against the fixing component 510*j* directly.

Figure 15:
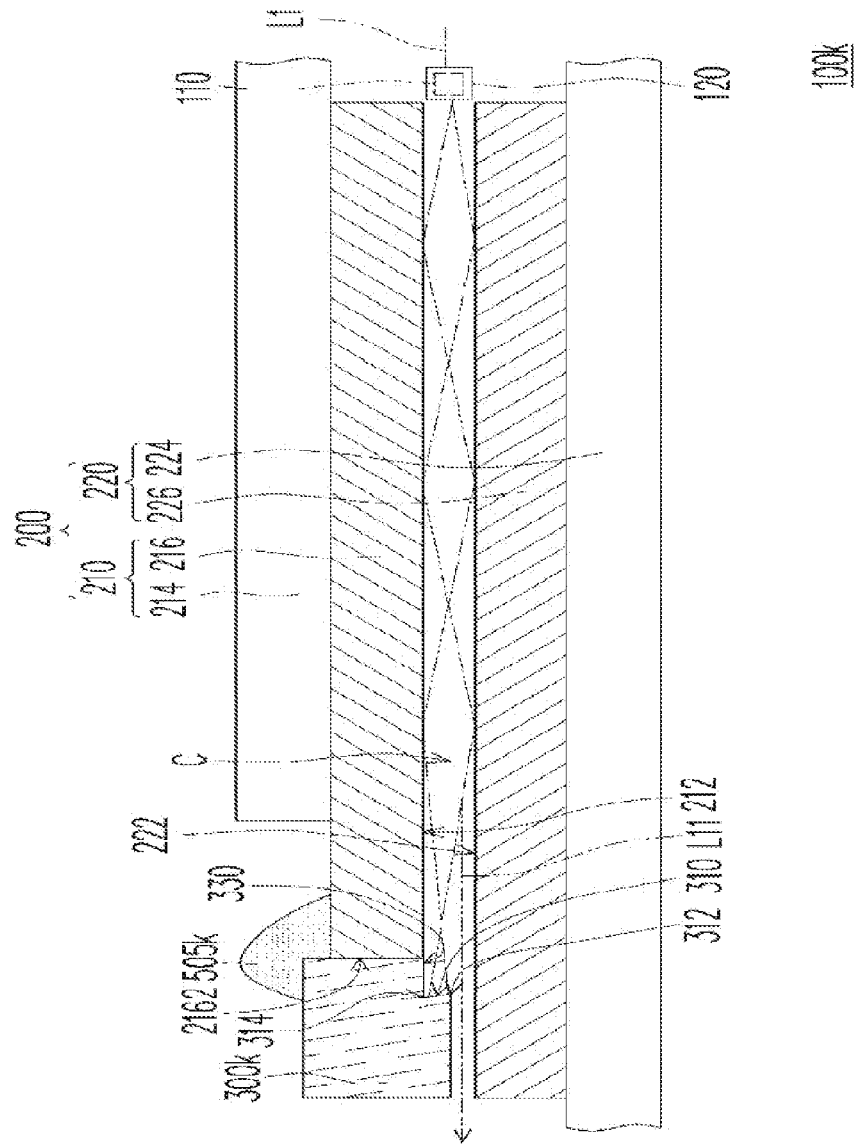
FIG. 15 is a side view of a spectrometer in accordance with another embodiment of the present invention.

FIG. 15 is a side view of a spectrometer in accordance with another embodiment of the present invention. Referring to FIG. 15, the spectrometer 100*k* of the present embodiment is similar to the spectrometer 100*j* shown in FIG. 14A. Differences between the two are described below. In the spectrometer 100*k* of the present embodiment, the diffractive component 300*k* is secured to a side 2162 of the reflective plate 216 by the connecting unit 505*k*. Specifically, the connecting unit 505*k*, an adhesive material for example, is used to affix the diffractive component 300*k* to the reflective plate 216. Such construction allows the position of the diffractive component 300*k* to be shifted corresponding to the expansion or contraction of the reflective plate 216. Accordingly, the connection between the diffractive component 300*k* and the reflective plate 216 is less susceptible to damage by thermal stress.

Figure 16:
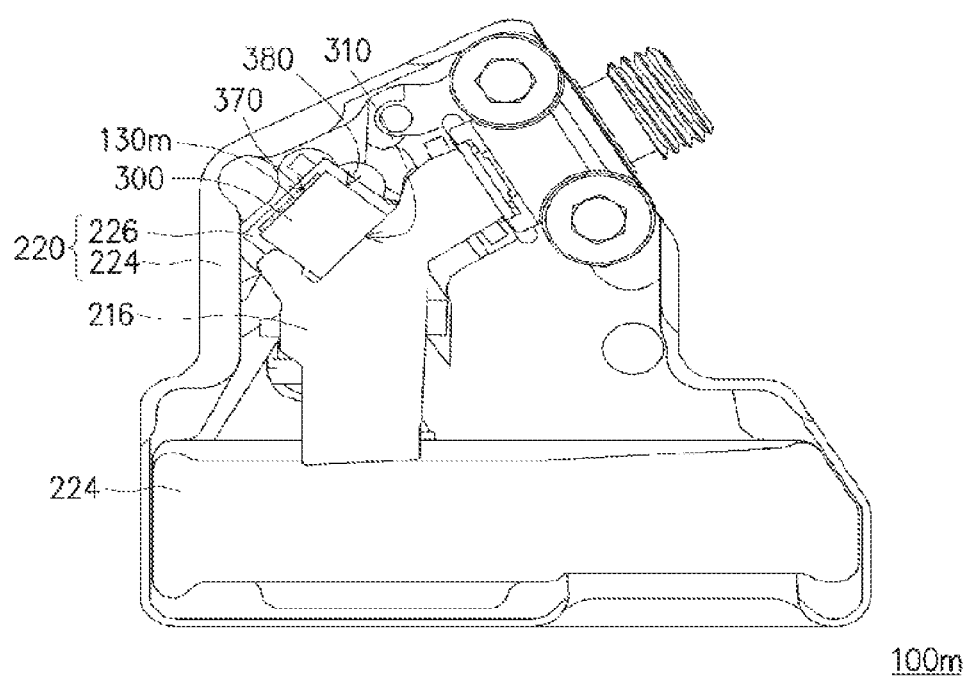
FIG. 16 is a top view of a spectrometer with a case partially removed in according with yet another embodiment of the present invention.

FIG. 16 is a top view of a spectrometer with a case partially removed in according with yet another embodiment of the present invention. Referring to FIG. 16, the spectrometer 100*m* of the present embodiment is similar to the spectrometer 100*e* shown in FIG. 8. Differences between the two are described below. In the spectrometer 100*m* of the present embodiment, the diffractive component 300 has a backside 370 opposite to the diffractive surface 310. The backside 370 is connected to the second base body 220 by an adhesive material 130*m* (the example of FIG. 16 shows the backside 370 connected to the reflective plate 226 of the second base body 220), thus securing the diffractive component 300 to the second base body 220. In addition, in the present embodiment, no adhesive material 130*m* is applied to a side surface 380 of the diffractive component 300 that connects the backside 370 with the diffractive surface 310. In this way, when there is a significant change in the ambient temperature, the position of the diffractive component 300 can vary by a larger margin, thus the connection between the diffractive component 300 and the second base body 220 is less susceptible to damage by thermal stress. In another embodiment, the side surface 380 of the diffractive component 300, connecting the backside 370 and the diffractive surface 310, may be coated with the adhesive material 130m.

In summary, in the spectrometers in accordance with the various embodiments of the present invention, since the first side of the diffractive surface is positioned between the first reflective surface and the second reflective surface in a direction perpendicular to the second reflective surface, a portion of light transmitted in the light channel that has higher intensity will be diffracted by the part of the diffractive surface having a sharper profile. As a result, the optical quality of the spectra measured by the spectrometer can be enhanced. In the spectrometers in accordance with the embodiments of the present invention, since the bottom surface of the notch of the diffractive component is inclined relative to the second reflective surface, the diffractive surface is generally parallel with the normal vector of the second reflective surface. As a result, the optical quality of the spectra obtained can be enhanced. In the methods for assembling spectrometers in accordance with the embodiments of the present invention, since the diffractive component is secured after either or both of the position and angle of the diffractive component has been adjusted and after the spectrum obtained has been determined to be sharp, the diffractive component can be secured at a suitable position. As a result, the optical quality of the spectra obtained can be enhanced. In the assembling system in accordance with the embodiments of the present invention, since the first fixture and the second fixture are adopted to adjust the relative positions of the diffractive component and the light sensor, respectively, the relative positions of the diffractive component and the light sensor can be accurately adjusted. As a result, the optical quality of the spectra obtained can be enhanced.

From the foregoing it would be appreciated that, although specific embodiments of the present invention have been described for purpose of illustration, by no means they are to be interpreted as limiting the scope of the present invention. Various modifications may be made without departing from the spirit and scope of the present invention. Accordingly, the scope of the present invention is to be determined entirely by the following claims.

What is claimed is:

1. A method for assembling a spectrometer, comprising:
   disposing a diffractive component along a side of a light channel of a waveguide module, wherein the waveguide module comprises a first reflective surface and a second reflective surface opposite to the first reflective surface, wherein the light channel is located between die first reflective surface and the second reflective surface, and wherein the diffractive component has a diffractive surface;
   disposing a light sensor on one end of the light channel;
   transmitting light to die diffractive surface via the light channel such that at least a portion of the light is diffracted into diffracted light by the diffractive surface and the diffracted light is incident on the light sensor;
   adjusting at least one of a position of the diffractive surface along a direction substantially perpendicular to the second reflective surface or an angle between the diffractive surface and the second reflective surface, and measuring a corresponding spectrum of light incident on the light sensor;
   determining whether the spectrum of the light incident on the light sensor meets a predefined first sharpness condition;
   securing the diffractive component when the spectrum of the light incident on the light sensor meets the predefined first sharpness condition; and
   adjusting either one or both of the position and the angle of the diffractive surface when the spectrum of the light incident on the light sensor does not meet the predefined first sharpness condition.

2. The method of claim 1, wherein transmitting light to the diffractive surface comprises transmitting the light to the diffractive surface sequentially through a light input port and the light channel, and wherein the method further comprises:
   adjusting the position of the diffractive surface along a direction that is substantially parallel to the second reflective surface.

3. The method of claim 1, wherein transmitting light to the diffractive surface comprises transmitting the light to the diffractive surface sequentially through a light input port and the light channel, and wherein the method further comprises:
   adjusting a distance between the diffractive surface and the light input port.

4. The method of claim 1, further comprising:
   adjusting a first rotation angle of the diffractive surface, wherein the first rotation angle is an angle around an axis that is substantially parallel to a normal vector of the second reflective surface.

5. The method of claim 1, wherein transmitting light to the diffractive surface comprises transmitting the light to the diffractive surface sequentially through a light input port and the light channel, and wherein the method further comprises:
   performing a six-axis adjustments to the diffractive component.

6. The method of claim 1, wherein securing the diffractive component comprises:
   securing the diffractive component to at least one of a first or a second base bodies by an adhesive material, the first base body having the first reflective surface and the second base body having the second reflective surface.

7. The method of claim 1, further comprising:
   adjusting at least one of a position or an angle of the light sensor with respect to the light channel.

8. The method of claim 1, further comprising:
   adjusting at least one of a position or an angle of the light sensor with respect to the light channel after securing the diffractive component, and measuring a corresponding spectrum of the light incident on the light sensor;
   determining whether the corresponding spectrum of the light incident on the light sensor meets a predefined second sharpness condition; and
   securing the light sensor when the corresponding spectrum of the light incident on the light sensor meets the predefined second sharpness condition; or
   adjusting at least one of the position or the angel of the light sensor until the corresponding spectrum of the light incident on the light sensor meets the predefined second sharpness condition.

9. The method of claim 1, wherein adjusting at least one of a position of the diffractive surface in a direction substantially perpendicular to the second reflective surface or an angle between the diffractive surface and the second reflective surface comprises:
   determining at least one of the position or the angle of the diffractive surface in a second measurement based on the at least one of the position or the angle of the diffractive surface used to obtain a spectrum in a first measurement.

10. The method of claim 1, wherein the diffractive component has an allocation surface and a notch located on a side of the allocation surface and including the diffractive surface inclined relative to the allocation surface, and adjusting the angle of the diffractive surface comprises:
   tilting the allocation surface relative to the second reflective surface such that the diffractive surface is generally parallel with a normal vector of the second reflective surface.

11. The method of claim 1, wherein the waveguide module comprises:
   a first base body having the first reflective surface; and
   a second base body having the second reflective surface, wherein the light channel is formed between the first base body and the second base body, and the diffractive component is disposed on the second base body;
   the method further comprising:
   disposing a heightening component between the diffractive component and the second base body, wherein the heightening component is disposed a side of the diffractive component which is further away from the diffractive surface.

12. An assembling system, comprising:
   a carrier that carries a waveguide module, the waveguide module having a first reflective surface, a second reflective surface opposite to the first reflective surface, and a light channel located between the first reflective surface and the second reflective surface;
   a first fixture that carries a diffractive component having a diffractive surface disposed along a side of the light channel, the first fixture adjusting at least one of a position of the diffractive component along a direction substantially perpendicular to the second reflective surface or an angle between the diffractive surface and the second reflective surface; and
   a second fixture that carries a light sensor disposed at one end of the light channel, the second fixture adjusting at least one of a position or an angle of the light sensor;
   a first actuator that drives the first fixture;
   a second actuator that drives the second fixture; and
   a controller electrically connected to the first actuator and the second actuator to control operations of the first actuator and the second actuator;
   wherein the controller is electrically connected to the light sensor, the controller receives spectral signals measured by the light sensor and determines at least one of a position or an angle of the diffractive component and at least one of a position or an angle of the light sensor based on the received spectral signals, the controller further determines whether a sharpness of the spectral signals meets a standard based on a determination procedure such that, when the standard is not met, the controller commands the first actuator and the second actuator to adjust the at least one of the position or the angle of the diffractive component or the at least one of the position or the angle of the light sensor until the sharpness of the spectral signals meets the standard.

13. The assembling system of claim 12, wherein one end of the waveguide module includes a light input port, and wherein the first fixture adjusts a position of the diffractive surface along a direction that is substantially parallel to the second reflective surface.

14. The assembling system of claim 12, wherein one end of the waveguide module includes a light input port, and wherein the first fixture adjusts a distance between the diffractive surface and the light input port.

15. The assembling system of claim 12, wherein the first fixture adjusts a first rotation angle of the diffractive surface, and wherein the first rotation angle is an angle around an axis that is substantially parallel to a normal vector of the second reflective surface.

16. The assembling system of claim 12, wherein one end of the waveguide module includes a light input port, wherein the first fixture performs a six-axis adjustments to the diffractive component.

17. The assembling system of claim 12, further comprising an adhesive dispenser, the adhesive dispenser applying an adhesive material onto the diffractive component to secure the diffractive component to at least one of a first base body having the first reflective surface or a second base body having the second reflective surface.

18. The assembling system of claim 12, wherein the controller is electrically connected to the adhesive dispenser, the controller determining whether a sharpness of the spectral signals meets a standard based on a determination procedure such that, when the standard is met, the controller commands the adhesive dispenser to apply the adhesive material onto the diffractive component.

19. The assembling system of claim 12, wherein the diffractive component has an allocation surface and a notch located on a side of the allocation surface and including the diffractive surface inclined relative to the allocation surface, wherein the first fixture adjusts the diffractive component to tilt the allocation surface relative to the second reflective surface such that the diffractive surface is generally parallel with a normal vector of the second reflective surface.

20. The assembling system of claim 19, wherein the waveguide module comprises:
   a first base body having the first reflective surface; and
   a second base body having the second reflective surface, wherein the light channel is formed between the first base body and the second base body, and the diffractive component is disposed on the second base body, wherein:
   the assembling system further comprises an adhesive dispenser to apply an adhesive material onto the diffractive component, thereby securing the diffractive component to a heightening component disposed between the diffractive component and the second base body, wherein the heightening component is disposed a side of the diffractive component which is further away from the diffractive surface.

* * * * *